US012561818B2

(12) United States Patent
Yucel et al.

(10) Patent No.: US 12,561,818 B2
(45) Date of Patent: Feb. 24, 2026

(54) METHOD, SYSTEM AND APPARATUS FOR MONOCULAR DEPTH ESTIMATION

(71) Applicant: SAMSUNG ELECTRONICS CO., LTD., Suwon-si (KR)

(72) Inventors: Mehmet Yucel, Surrey (GB); Albert Saà-Garriga, Surrey (GB); Valia Dimaridou, Salonika (GR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 402 days.

(21) Appl. No.: 17/960,571

(22) Filed: Oct. 5, 2022

(65) Prior Publication Data

US 2023/0114028 A1 Apr. 13, 2023

(30) Foreign Application Priority Data

Oct. 8, 2021 (GR) .............................. 20210100687
Oct. 12, 2021 (GB) .................................... 2114603

(51) Int. Cl.
| | |
|---|---|
| *G06T 7/50* | (2017.01) |
| *G06N 3/098* | (2023.01) |

(Continued)

(52) U.S. Cl.
CPC .............. *G06T 7/50* (2017.01); *G06V 10/761* (2022.01); *G06V 10/776* (2022.01); *G06T 2207/20081* (2013.01)

(58) Field of Classification Search
CPC .............. G06T 7/50; G06T 2207/20081; G06T 2207/20084; G06V 10/761; G06V 10/776;

(Continued)

(56) References Cited

U.S. PATENT DOCUMENTS 11,409,633 B2 * 8/2022 Das ..................... G06F 11/3608
11,496,722 B1 * 11/2022 Satat ....................... G06T 7/593

(Continued)

FOREIGN PATENT DOCUMENTS

KR 10-2019-0083127 7/2019

OTHER PUBLICATIONS

L. U. Khan, W. Saad, Z. Han, E. Hossain and C. S. Hong, "Federated Learning for Internet of Things: Recent Advances, Taxonomy, and Open Challenges," in IEEE Communications Surveys & Tutorials, vol. 23, No. 3, pp. 1759-1799, thirdquarter 2021, doi: 10.1109/COMST.2021.3090430 (Year: 2021).*

(Continued)

*Primary Examiner* — Amandeep Saini
*Assistant Examiner* — Andrew S Budisalich
(74) *Attorney, Agent, or Firm* — Nixon & Vanderhye, P.C.

(57) ABSTRACT

Broadly speaking, this disclosure generally relates to methods, systems and apparatuses for performing monocular depth estimation, i.e. depth estimation using a single camera. In particular, this disclosure relates to a method for generating a training dataset for training a machine learning, ML, model using federated learning to perform depth estimation. Advantageously, the method to generate a training dataset enables a diverse training dataset to be generated while maintaining user data privacy. This disclosure also provides methods for training the ML model using the generated training dataset. Advantageously, the methods determine whether a community ML model that is trained by client devices needs to be retrained, and/or whether a global ML model, which is used to generate the community ML model, needs to be retrained.

12 Claims, 13 Drawing Sheets

(51) Int. Cl.
    *G06V 10/74*        (2022.01)
    *G06V 10/776*      (2022.01)
    *G06V 10/82*        (2022.01)

(58) Field of Classification Search
    CPC .. G06V 10/82; G06V 20/647; G06V 2201/10;
                                          G06N 3/098
    See application file for complete search history.

(56)                  References Cited

U.S. PATENT DOCUMENTS

| | | | |
|---|---|---|---|
| 11,507,836 B1* | 11/2022 | Kurz | G06N 3/0455 |
| 2007/0174816 A1* | 7/2007 | Cavanaugh | G06F 11/3672 |
| | | | 717/124 |
| 2008/0212421 A1* | 9/2008 | Kitagawa | H04N 5/76 |
| | | | 369/47.12 |
| 2009/0164741 A1* | 6/2009 | Takaki | G06F 16/113 |
| | | | 711/158 |
| 2011/0210969 A1 | 9/2011 | Barenbrug | |
| 2012/0014456 A1 | 1/2012 | Martinez Bauza et al. | |
| 2013/0050747 A1* | 2/2013 | Cok | H04N 1/00169 |
| | | | 358/1.15 |
| 2019/0279293 A1* | 9/2019 | Tang | G06N 3/045 |
| 2020/0117991 A1* | 4/2020 | Suzuki | G06N 3/045 |
| 2020/0190595 A1* | 6/2020 | Takamitsu | C12N 15/09 |
| 2020/0327005 A1* | 10/2020 | Singh | G06F 11/302 |
| 2021/0004589 A1* | 1/2021 | Turkelson | G06V 30/19173 |
| 2021/0065440 A1* | 3/2021 | Sunkavalli | G06T 7/90 |
| 2021/0073639 A1* | 3/2021 | Jakkam Reddi | G06N 3/084 |
| 2021/0174513 A1* | 6/2021 | Chidlovskii | G06N 3/08 |
| 2021/0209387 A1* | 7/2021 | Nikitidis | G06V 10/764 |
| 2022/0012549 A1* | 1/2022 | Nielsen | G06V 10/776 |
| 2022/0277514 A1* | 9/2022 | Yin | G06T 7/529 |
| 2022/0374635 A1* | 11/2022 | Xiong | G08B 13/19608 |

OTHER PUBLICATIONS

Diao, Enmao, Jie Ding, and Vahid Tarokh. "Heterofl: Computation and communication efficient federated learning for heterogeneous clients." arXiv preprint arXiv:2010.01264 (2020). (Year: 2020).*
Martin D. Smith, Joel O. Wertheim, Steven Weaver, Ben Murrell, Konrad Scheffler, Sergei L. Kosakovsky Pond, Less is More: An Adaptive Branch-Site Random Effects Model for Efficient Detection of Episodic Diversifying Selection, Molecular Biology and Evolution, vol. 32, Issue 5, pp. 1342-1313 (Year: 2015).*

* cited by examiner

FIG. 2

On-device sensors 204

Model Update via Federated Learning

FIG. 3

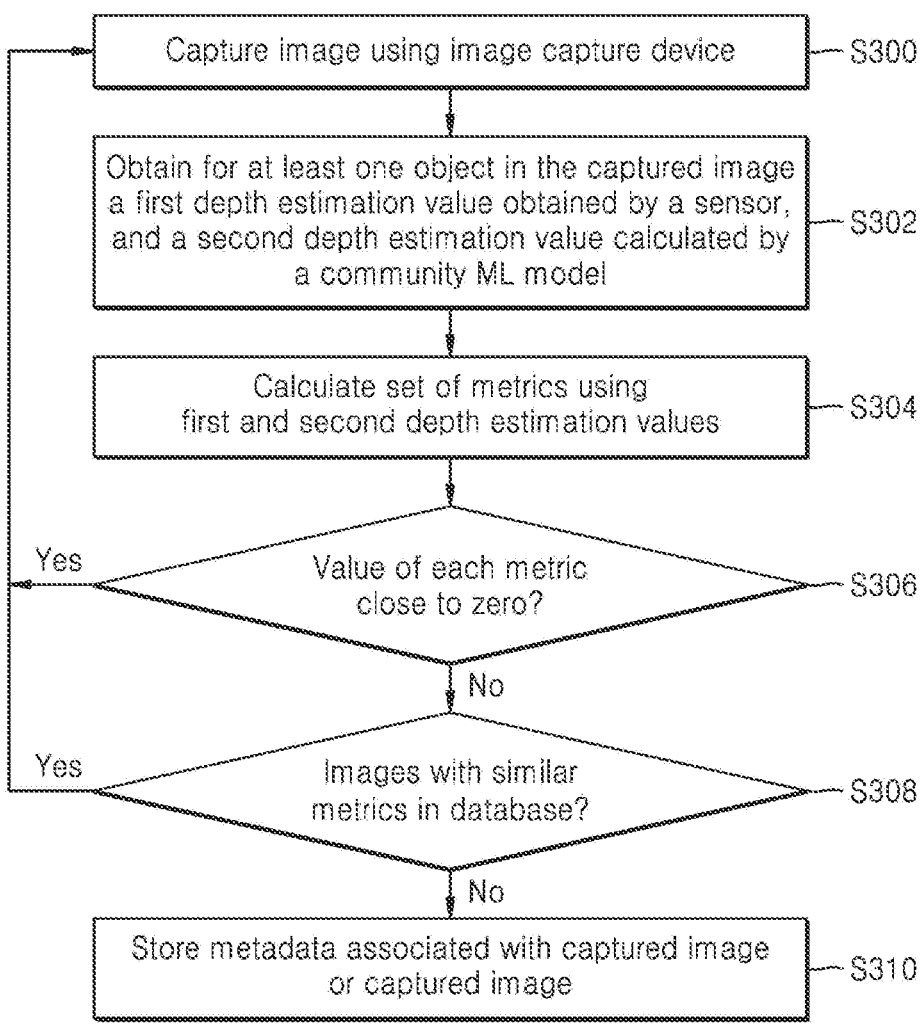

Data Generation

Capture image using image capture device — S300

Obtain for at least one object in the captured image a first depth estimation value obtained by a sensor, and a second depth estimation value calculated by a community ML model — S302

Calculate set of metrics using first and second depth estimation values — S304

Value of each metric close to zero? — S306

Yes

No

Images with similar metrics in database? — S308

Yes

No

Store metadata associated with captured image or captured image — S310

Step S310

New sample

S500 Space Available?

No → Compare to existing items in DB — S504

Yes — S502 → Save new sample to DB

S506 Is there a low priority sample?

No → Discard new sample — S510

Yes — S508 → Remove low priority sample in DB

Importance levels
· Structure + Scale errors
· Structure errors
· Scale errors

If two samples are in the same category;
· Pick one with worse metrics (i.e. error/loss)

Training ML model by server

FIG. 11

METHOD, SYSTEM AND APPARATUS FOR MONOCULAR DEPTH ESTIMATION

CROSS REFERENCE TO RELATED APPLICATION

This application is based on and claims priority under 35 U.S.C. § 119 from GR application No. 20210100687, filed on Oct. 8, 2021, in the GR Intellectual Property Office and GB application No. 2114603.0, filed on Oct. 12, 2021, in the GB Patent Office, the disclosure of which is incorporated by reference herein in its entirety.

FIELD

This disclosure generally relates to methods, systems and apparatuses for performing monocular depth estimation, i.e. depth estimation using a single camera. In particular, this disclosure relates to a computer-implemented method for generating a training dataset for training a machine learning, ML, model using federated learning to perform depth estimation, and methods for training the ML model using the generated training dataset.

BACKGROUND

Over the past few years, advances in deep learning have revolutionized the way people interact with everyday devices. Much of this success relies on the availability of large-scale training infrastructures and the collection of vast amounts of training data. However, users and providers are becoming increasingly aware of the privacy implications of this ever-increasing data collection, leading to the creation of various privacy-preserving initiatives by service providers and government regulators.

Federated Learning is a relatively new subfield of machine learning, ML, that allows the training of ML models without the training data leaving user devices. Instead, federated learning enables individual client devices to collaboratively train a ML model by moving the training computation to the client devices, while keeping all the training data private. During each round of the training process, participating client devices download the latest version of a global model and compute an updated model using their local data (i.e. data that is local to or stored on the client devices). These locally trained models are then sent from the participating client devices back to a central server which aggregates all the received locally trained models to generate an updated version of the global model. This is in contrast to centralized training where the training mechanism (e.g. the central server) has access to all the training data. Client devices can be mobile devices such as smartphones, appliances, wearables, or even servers or systems of entities such as hospitals and organizations. Therefore, it is desirable from data privacy and security perspectives to keep the data on those client devices private and avoid sharing the data with a central server to train a global model.

Depth estimation is used for a variety of purposes, such as autonomous driving, robotics, and augmented reality. Knowing the distance of an object relative to a camera is key for performing tasks such as navigation. Typically, depth estimation is performed using specialized sensors, such as time-of-flight, ToF, sensors or red-green-blue-depth, RGB-D, cameras. However, such specialized sensors are typically not included in consumer electronic devices, such as smartphones, for a variety of reasons including increased cost of manufacture and lack of space in the device. Yet, it may be advantageous to enable consumer electronic devices to perform depth estimation tasks. For example, it may be useful for a consumer robotic device (e.g. a robotic vacuum cleaner or a robotic assistant), so that the robotic device is able to navigate through an environment and interact with objects in the environment.

Therefore, the present applicant has recognized the need for an improved technique for monocular depth estimation.

SUMMARY

In an embodiment, there is provided a method for generating a training dataset for training a machine learning, ML, model using federated learning to perform depth estimation, the method comprising: obtaining a first image from a client device; obtaining for at least one object in the first image: a first depth estimation value obtained by a sensor of the client device, and a second depth estimation value calculated by a community ML model, wherein the community ML model is a scaled version of a global ML model; calculating a first set of metrics using the first and second depth estimation values, the first set of metrics indicating a difference between the first and second depth estimation values; determining whether a value of each metric in the first set of metrics is close to zero; and determining, when the value of each metric is not close to zero, whether the similarity between the first set of metrics and a second set of metrics corresponding to a second image from among images within a database of the client device is greater than a threshold value, the database forming a training dataset for further training of the community ML model. The sensor may be a depth sensor, time-of-flight sensor, a sensor comprising multiple cameras, or any other suitable device for capturing the ground-truth (i.e. first depth estimation value). The sensor may be activated or sensing data when an image capture device is capturing an image, such that the captured image and the sensor data are related.

The method may comprise storing metadata associated with the captured image in the database of the client device when there are no images with similar first and second metrics in the database.

As explained in more detail below with respect to the Figures, existing machine learning methods to perform depth estimation require large volumes of diverse image data to be trained. More specifically, the image data needs to be labelled with depth information to enable the ML model to learn how to predict depth of objects in an image. Small training datasets usually result in low-accuracy models, and poor generalization. That is, if a ML model has poor generalization capability, it will not be able to accurately perform depth estimation on an image that does not resemble an image it has previously seen (i.e. been trained on). Similarly, large but non-diverse training datasets also suffer from poor generalization. Large and diverse training datasets that are labelled with depth information difficult to obtain, as the larger the dataset, the longer the laborious data labelling process will take.

Embodiments of this disclosure overcome these issues by providing a data generation technique that generates data suitable for training a ML model to perform depth estimation. As noted above, the data generation technique of embodiments of this disclosure enables a diverse training dataset to be generated, while maintaining user data privacy. A training dataset is generated on a per-client device basis. That is, each client device that participates in the federated learning process generates its own training dataset to train a local version of a global model. The local model is called a "community" model herein. Advantageously, this means that the images which form the training dataset are retained on the client device, but weights of the model may be shared with other devices and/or a central server to enable other local versions of the global model, or the global model itself, to be updated. Thus, images captured by a large number of client devices are used to train a ML model, without having to share the images themselves. The fact that many client devices are being used to train a ML model itself improves the ML model, as the images captured by the client devices are likely to be diverse.

Further advantageously, the data generation technique described herein decides whether or not a captured image should be included in the training dataset based on whether the captured image is valuable for training purposes. For example, if the first depth estimation value obtained by the sensor and the second depth estimation value calculated by the community ML model are similar (or the metrics calculated using the two values are close to zero), then the captured image is not useful for training the community ML model. This is because the community ML model is already able to estimate depth of objects in the captured image as well as the sensor. This may be because the captured image is similar to other images that the community ML model has already been trained using. Similarly, if the two values are not similar (or the metrics calculated using the two values are not close to zero), the data generation technique looks to see whether images with similar metrics already exist in the training database. If images with similar metrics already exist, then there is no need to add this captured image to the training database, as this will not increase the diversity of the training data. In this way, the data generation decides on an image-by-image basis whether the image is useful for training (i.e. further training) the community ML model.

The data generation method may further comprise determining whether a value of a first metric of the set of metrics indicates there are structural errors in the community model that require the global model to be retrained. In this case, the step of storing metadata may comprise storing a flag indicating a structural error when the value of the first metric indicates there are structural errors.

The data generation method may further comprise determining whether a value of a second metric of the set of metrics indicates there are scale errors in the community model that require the community model to be retrained. In this case, the step of storing metadata may comprise storing a flag indicating a scale error when the value of the second metric indicates there are structural errors.

As will be explained in more detail with respect to the Figures, scale issues generally indicate a problem with the training of the community ML model. Scale issues mean that, for example, the community ML model is able to determine the relative positions of objects relative to the client device (or image capture device thereof), but does not accurately determine the actual distances of those objects. That is, the community ML model can determine that, in an image showing objects A and B, object A is closer to the client device than object B, but does not correctly calculate the distance of the objects. A scaling issue usually relates to issues with the community ML model. Scaling issues are considered the lowest priority error. In contrast, structural issues generally indicate a problem with the training of the global ML model. Structural issues mean that, for example, the model does not know how to correctly order the objects A and B in depth space, or completely misses an object from the image. These issues indicate problems with the global model as it is having difficulty identifying and dealing with objects in the image, and suggests the global model has not been trained on a diverse training dataset. Similarly, an image may indicate structural and scaling issues. This is considered the highest priority error. Thus, the value of a captured image for the purpose of training may depend on the priority of the error. Captured images that lead to the highest priority error are more valuable than images that lead to the lowest priority error and those which have no error at all.

Storing metadata associated with the captured image may comprise storing one or more of: a location of the captured image in storage, an identifier of the captured image, the calculated set of metrics, a value of a difference between the first metric and second metric, a flag indicating a structural error, and a flag indicating a scale error. Thus, in some cases, the captured image that is suitable for training is not itself added to the database. The captured image may be stored elsewhere on the client device (such as in the photo gallery of the client device), and information identified the captured image is stored in the database to avoid duplicating images and using-up valuable storage space. The metrics and/or flags may be stored to enable incoming images to be readily compared with images that already form the training dataset, which as explained above, enables the suitability of the incoming image for training purposes to be determined.

Calculating the first metric may comprises calculating a scale-invariant root mean square error, SI-RMSE, using the first and second depth estimation values, and calculating the second metric comprises calculating a root mean square error, RMSE, using the first and second depth estimation values. It will be understood that these are examples of the first and second metric, and any suitable metric may be used. For example, the first metric may be a structural similarity index measure, SSIM.

Calculating a set of metrics may comprise calculating one or more of: a root mean square error (RMSE), a scale invariant root mean square error (SI-RMSE), an adaptive branch-site random effects likelihood (AbsRel), and a log-likelihood (Log10Rel). It will be understood that these are example, non-limiting metrics that can be used to assess whether an incoming image is suitable for further training the community ML model (and potentially the global ML model).

As noted above, in some cases the captured image that is determined to be suitable for addition to the training dataset is not itself stored in the database, to save storage space. However, in other cases, the image may be stored. Thus, the data generation method may further comprise storing the captured image alongside the metadata. Preferably therefore, when the captured image is to be stored, the data generation method comprises determining whether there is sufficient space in the database to store the captured image. When it is determined there is insufficient space in the database to store the captured image, the method further comprises: comparing the metadata associated with the captured image with the metadata stored in the database; identifying whether there is a lower priority image in the database; and removing the lower priority image and saving the captured image (or just the associated metadata) in the database, when a lower priority image is identified. That is, as explained above, the images (or metadata) in the database may be associated with a priority based on the type of error they indicate, and this priority may be used to determine whether to retain an image (or metadata) in the database or to replace it with an incoming image with a higher priority. This improves the diversity and usefulness of the training dataset.

In an embodiment, there is provided a client device for generating a training dataset for training a machine learning, ML, model using federated learning to perform depth estimation, the client device comprising: an image capture device; a sensor; storage comprising: a community ML model for training by the client device, wherein the community ML model is a scaled version of a global ML model, and a database forming a training dataset for training of the community ML model; and at least one processor coupled to memory and arranged to: receive a first image captured using the image capture device; obtain for at least one object in the first image: a first depth estimation value obtained by the sensor, and a second depth estimation value calculated by a community ML model, wherein the community ML model is a scaled version of a global ML model; calculate a first set of metrics using the first and second depth estimation values, the first set of metrics indicating a difference between the first and second depth estimation values, determine whether a value of each metric in the first set of metrics is close to zero; and determine, when the value of each metric is not close to zero, whether the similarity between the first set of metrics and a second set of metrics corresponding to the second image from among images within a database of the client device is greater than a threshold value, the database forming a training dataset for further training of the community ML model.

The features described above with respect to the first approach apply equally to the second approach.

The client device may be: a smartphone, tablet, laptop, computer or computing device, virtual assistant device, a vehicle, a drone, an autonomous vehicle, a robot or robotic device, a robotic assistant, image capture system or device, an augmented reality system or device, a virtual reality system or device, a gaming system, an Internet of Things device, a smart consumer device, a smartwatch, a fitness tracker, and a wearable device. It will be understood that this is a non-exhaustive and non-limiting list of example apparatus.

The sensor may be a depth sensor, time-of-flight sensor, a sensor comprising multiple cameras, or any other suitable device for capturing the ground-truth (i.e. first depth estimation value). The sensor may be activated or sensing data when an image capture device is capturing an image, such that the captured image and the sensor data are related.

In an embodiment, there is provided a computer-implemented method, performed by a server, for training a machine learning, ML, model using federated learning to perform depth estimation, the method comprising: obtaining and storing a global ML model for training; generating a plurality of community models from the global ML model, wherein each community model is a scaled version of the global ML model that has been scaled based on computation properties of client devices within the community; distributing each community model to the client devices within the corresponding community for local training by the client devices; receiving, from each community, model weights generated by the local training, wherein the model weights indicate structural errors in the model that require the global model to be retrained; and updating the global ML model using the received model weights.

Thus, as mentioned above, each client device enrolled in the federated learning process trains a local version of a global model. Specifically, each client device trains a community ML model, which is a scaled version of a global ML model. The global ML model is stored by a central server. The central server is responsible for generating and distributing the scaled version of the global ML model to the client devices. Since client devices have different specifications and processing capabilities, client devices are grouped into communities, where the devices within a community have similar properties. For example, all client devices that are high-end/top-tier smartphones may be grouped together in a community, while client devices that are wearable devices with limited processing resource may be grouped together in another community. The central server then generates community models based on the global ML model, based on the computation properties of the client devices within each community, and distributes these community models for local training. As mentioned above, when the local training by the client devices indicates that there is a structural problem in the global ML model, the client devices send model weights to the central server, and the central server retrains the global ML model using the received model weights. This ensures that structural errors are addressed centrally and that all communities receive an updated community model based on the retrained global ML model.

Thus, the method may further comprise: regenerating the plurality of community models based on the updated global ML model; and distributing each updated community model to the corresponding community.

In an embodiment, there is provided a computer-implemented method, performed by a client device, for training a machine learning, ML, model using federated learning to perform depth estimation, the method comprising: obtaining and storing a community ML model for training by a community of client devices, wherein the community ML model is a scaled version of a global ML model; training the community ML model based on a training database on the client device, the training database comprising suitable images captured by an image capture device of the client device; obtaining for at least one object in an image: a first depth estimation value obtained by a sensor, and a second depth estimation value calculated by the community ML model; calculating a first metric using the first and second depth estimation values, wherein a value of the first metric indicates whether there are structural errors in the community model that require the global model to be retrained; calculating a second metric using the first and second depth estimation values, wherein a value of the second metric indicates whether there are scale errors in the community model that require the community model to be retrained; and sharing model weights generated by the training with: a central server for updating the global model when the value of the first metric indicates there are structural errors, and other client devices in the community when a value of the second metric indicates there are scale errors.

Advantageously, the training method performed by the client device highlights whether there are any scale errors in the community model, any structural errors in the global model, or both scale errors and structural errors. The model weights are then shared with other devices in the community and/or with the central server to enable retraining of the appropriate model. A benefit of only sharing model weights with other client devices in a community when there is a scale error is that it makes more efficient use of bandwidth. Scale errors are likely due to the properties of the client devices, and therefore, client devices in other communities will not be affected in the same way. In contrast, structural errors impact all devices and therefore, it is more efficient to send model weights to the central server so that the global model can be updated than to send model weights to every client device or to every community.

Sharing model weights generated by the training with other client devices in the community may comprise: transmitting model weights to at least one other client device using a peer-to-peer distribution mechanism, thereby enabling each client device to update their stored community ML model. In this case, each client device may be responsible for aggregating model weights and updating its own community model.

Alternatively, sharing model weights generated by the training with other client devices in the community may comprise: transmitting model weights to a community central server for aggregation, thereby enabling the community central server to update the community ML model and distribute an updated community central server to the client devices in the community. The community central server may perform a similar function to the central server, except with respect to a single community rather than all communities. The community central server may aggregate all received model weights from the client devices in the community, and use this to update the community ML model. The updated community ML model may then be distributed by the community central server to all client devices in the community. In some cases, the community central server may not be a separate server, but may instead be one client device of the plurality of client devices. This client device may assume the role of a community central server and aggregate model weights received from other client devices in the community. Thus, the term "community central server" used herein encompasses both a dedicated server and a client device acting as a server.

Sharing model weights generated by the training with a central server may comprise: transmitting model weights to a central server for aggregation, thereby enabling the central server to update the global ML model upon which the community ML model is based.

Calculating the first metric may comprise calculating a scale-invariant root mean square error, SI-RMSE, using the first and second depth estimation values, and calculating the second metric ma comprise calculating a root mean square error, RMSE, using the first and second depth estimation values. It will be understood that these are examples of the first and second metric, and any suitable metric may be used. For example, the first metric may be a structural similarity index measure, SSIM.

When the scale-invariant root mean square error, SI-RMSE, is low and the root mean square error, RMSE, is high, the community ML model may have a scale error.

When the scale-invariant root mean square error, SI-RMSE, is high and the root mean square error, RMSE, is low, the community ML model may have a structural error.

When the scale-invariant root mean square error, SI-RMSE, is high and the root mean square error, RMSE, is high, the community ML model may have a scale error and a structural error.

The training method performed by the client device may further comprise: checking, prior to training the community ML model, whether the client device is able to train the community ML model. That is, when the client device is instructed to train the community ML model, the client device may not automatically begin the training but may instead perform checks to determine whether the client device is able to train. The checking may comprise checking at least that there are images in the training database to be used for training, and that an operational state of the client device is suitable for training. Checking the operational state of the client device may comprise checking a temperature of the client device, whether the client device is charging (i.e. whether a battery-operated device is plugged into a mains power supply or is running using the battery power), the current CPU and/or GPU usage, and whether there is training data on the client device that can be used for training.

The training method performed by the client device may further comprise: receiving, prior to training, a request to train the community ML model from the central server, from another client device in the community, or from a community central server. In other words, the client device may only begin training in response to receiving a request to perform training. Even if the request is received, the client device may begin training only if the checks mentioned above indicate the client device is currently able to participate in training.

In an embodiment, there is provided a system for training a machine learning, ML, model using federated learning to perform depth estimation, the system comprising: a central server comprising at least one processor coupled to memory, wherein the central server is arranged to: obtain and storing a global ML model for training; generate a plurality of community models from the global ML model, wherein each community model is a scaled version of the global ML model that has been scaled based on computation properties of client devices within the community; and distribute each community model to the client devices within the corresponding community for local training by the client devices; and a plurality of client device communities, wherein each community comprises a plurality of client devices that are grouped together based on having similar computation properties, wherein each client device comprises at least one processor coupled to memory and is arranged to: receive, from the central server, a community ML model for training; train the community ML model based on a training database on the client device, the training database comprising suitable images captured by an image capture device of the client device; obtain for at least one object in an image: a first depth estimation value obtained by a sensor of the client device, and a second depth estimation value calculated by the community ML model; calculate a first metric using the first and second depth estimation values, wherein a value of the first metric indicates whether there are structural errors in the community model that require the global model to be retrained; calculate a second metric using the first and second depth estimation values, wherein a value of the second metric indicates whether there are scale errors in the community model that require the community model to be retrained; and share model weights generated by the training with: a central server for updating the global model when the value of the first metric indicates there are structural errors, and other client devices in the community when a value of the second metric indicates there are scale errors, wherein the central server is further arranged to: receive, from each community, model weights generated by the local training, wherein the model weights indicate structural errors in the model that require the global model to be retrained; and update the global ML model using the received model weights.

The central server may be arranged to: regenerate the plurality of community models based on the updated global ML model; and distribute each updated community model to the corresponding community.

The client device may be arranged to share model weights generated by the training with other client devices in the community by: transmitting model weights to at least one other client device using a peer-to-peer distribution mechanism, thereby enabling each client device to update their stored community ML model.

The client device may be arranged to share model weights generated by the training with other client devices in the community by: transmitting model weights to a community central server for aggregation, thereby enabling the community central server to update the community ML model and distribute an updated community central server to the client devices in the community.

The client device may be arranged to share model weights generated by the training with the central server by: transmitting model weights to a central server for aggregation, thereby enabling the central server to update the global ML model upon which the community ML model is based.

The client device may be arranged to calculate the first metric by calculating a scale-invariant root mean square error using the first and second depth estimation values, and to calculate the second metric by calculating a root mean square error using the first and second depth estimation values.

When the scale-invariant root mean square error is low and the root mean square error is high, the community ML model may have a scale error. When the scale-invariant root mean square error is high and the root mean square error is low, the community ML model may have a structural error. When the scale-invariant root mean square error is high and the root mean square error is high, the community ML model may have a scale error and a structural error.

The processor of the client device may be arranged to: check, prior to training the community ML model, whether the client device is able to train the community ML model. The checking may comprise checking at least that there are images in the training database to be used for training, and that an operational state of the client device is suitable for training.

The processor of the client device may be arranged to: receive, prior to training, a request to train the community ML model from the central server, from another client device in the community, or from a community central server.

In an embodiment, there is provided a client device for training a machine learning, ML, model using federated learning, the client device comprising: at least one processor coupled to memory and arranged to: receive, from a central server, a community ML model for training, wherein the community ML model is a scaled version of a global ML model; train the community ML model based on a training database on the client device, the training database comprising suitable images captured by an image capture device of the client device; obtain for at least one object in an image: a first depth estimation value obtained by the a sensor of the client device, and a second depth estimation value calculated by the community ML model; calculate a first metric using the first and second depth estimation values, wherein a value of the first metric indicates whether there are structural errors in the community model that require the global model to be retrained; calculate a second metric using the first and second depth estimation values, wherein a value of the second metric indicates whether there are scale errors in the community model that require the community model to be retrained; and share model weights generated by the training with: a central server for updating the global model when the value of the first metric indicates there are structural errors, and other client devices in the community when a value of the second metric indicates there are scale errors.

In an embodiment, there is provided a non-transitory data carrier carrying processor control code to implement the methods described herein. That is, there is provided a computer-readable storage medium comprising instructions which, when executed by a computer, cause the computer to carry out the steps of the methods described herein.

As will be appreciated by one skilled in the art, an embodiment of this disclosure may be embodied as a system, method or computer program product. Accordingly, an embodiment of this disclosure may take the form of an entirely hardware embodiment, an entirely software embodiment, or an embodiment combining software and hardware aspects.

Furthermore, an embodiment of this disclosure may take the form of a computer program product embodied in a computer readable medium having computer readable program code embodied thereon. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing.

Computer program code for carrying out operations of an embodiment of this disclosure may be written in any combination of one or more programming languages, including object oriented programming languages and conventional procedural programming languages. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

Embodiments of this disclosure also provide a non-transitory data carrier carrying code which, when implemented on a processor, causes the processor to carry out any of the methods described herein.

Embodiments of this disclosure further provide processor control code to implement the above-described methods, for example on a general purpose computer system or on a digital signal processor (DSP). Embodiments of this disclosure also provide a carrier carrying processor control code to, when running, implement any of the above methods, in particular on a non-transitory data carrier. The code may be provided on a carrier such as a disk, a microprocessor, CD- or DVD-ROM, programmed memory such as non-volatile memory (e.g. Flash) or read-only memory (firmware), or on a data carrier such as an optical or electrical signal carrier. Code (and/or data) to implement embodiments of this disclosure described herein may comprise source, object or executable code in a conventional programming language (interpreted or compiled) such as Python, C, or assembly code, code for setting up or controlling an ASIC (Application Specific Integrated Circuit) or FPGA (Field Programmable Gate Array), or code for a hardware description language such as Verilog® or VHDL (Very high speed integrated circuit Hardware Description Language). As the skilled person will appreciate, such code and/or data may be distributed between a plurality of coupled components in communication with one another. Embodiments of this disclosure may comprise a controller which includes a microprocessor, working memory and program memory coupled to one or more of the components of the system.

It will also be clear to one of skill in the art that all or part of a logical method according to embodiments of this disclosure may suitably be embodied in a logic apparatus comprising logic elements to perform the steps of the above-described methods, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

An embodiment of this disclosure may be realized in the form of a data carrier having functional data thereon, said functional data comprising functional computer data structures to, when loaded into a computer system or network and operated upon thereby, enable said computer system to perform all the steps of the above-described method.

The methods described above may be wholly or partly performed on an apparatus, i.e. an electronic device, using a machine learning or artificial intelligence model. The model may be processed by an artificial intelligence-dedicated processor designed in a hardware structure specified for artificial intelligence model processing. The artificial intelligence model may be obtained by training. Here, "obtained by training" means that a predefined operation rule or artificial intelligence model configured to perform a desired feature (or purpose) is obtained by training a basic artificial intelligence model with multiple pieces of training data by a training algorithm. The artificial intelligence model may include a plurality of neural network layers. Each of the plurality of neural network layers includes a plurality of weight values and performs neural network computation by computation between a result of computation by a previous layer and the plurality of weight values.

As mentioned above, embodiments of this disclosure may be implemented using an AI model. A function associated with AI may be performed through the non-volatile memory, the volatile memory, and the processor. The processor may include one or a plurality of processors. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). The one or a plurality of processors control the processing of the input data in accordance with a predefined operating rule or artificial intelligence (AI) model stored in the non-volatile memory and the volatile memory. The predefined operating rule or artificial intelligence model is provided through training or learning. Here, being provided through learning means that, by applying a learning algorithm to a plurality of learning data, a predefined operating rule or AI model of a desired characteristic is made. The learning may be performed in a device itself in which AI according to an embodiment is performed, and/or may be implemented through a separate server/system.

The AI model may consist of a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning algorithm is a method for training a predetermined target device (for example, a robot) using a plurality of learning data to cause, allow, or control the target device to make a determination or prediction. Examples of learning algorithms include, but are not limited to, supervised learning, unsupervised learning, semi-supervised learning, or reinforcement learning.

BRIEF DESCRIPTION OF DRAWINGS

Embodiments of this disclosure will now be described, by way of example only, with reference to the accompanying drawings, in which:

FIG. 2 is a schematic diagram showing an embodiment of this disclosure for training a ML model to perform depth estimation;

FIG. 3 is a flowchart of example steps to generate training data suitable for training a ML model to perform depth estimation;

FIG. 11 is block diagram of a system for training a ML model using federated learning to perform depth estimation.

DETAILED DESCRIPTION

Figure 1A:
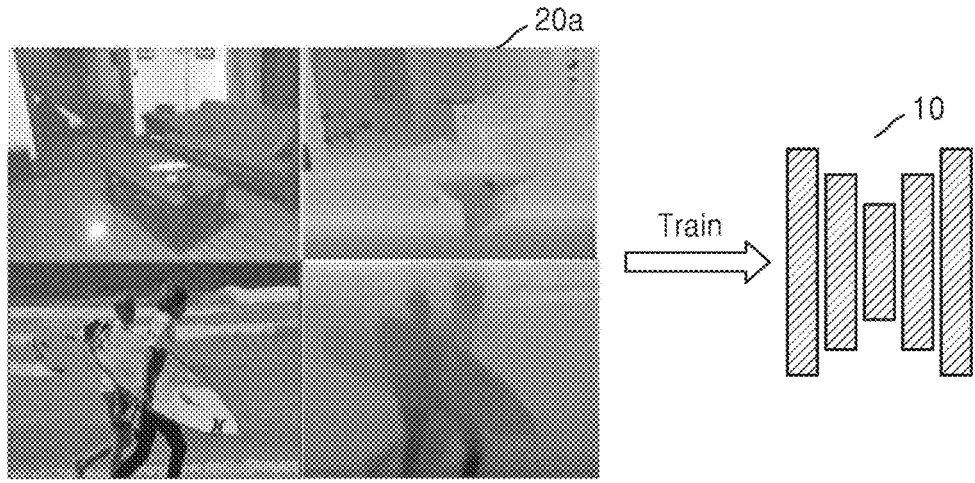
FIGS. 1A, 1B, and 1C show existing techniques for training a machine learning, ML, model to perform depth estimation.

Broadly speaking, embodiments of this disclosure generally relate to methods, systems and apparatuses for performing monocular depth estimation, i.e. depth estimation using a single camera. In particular, this disclosure relates to a computer-implemented method for generating a training dataset for training a machine learning, ML, model using federated learning to perform depth estimation. Advantageously, the method to generate a training dataset enables a diverse training dataset to be generated while maintaining user data privacy. This disclosure also provides methods for training the ML model using the generated training dataset. Advantageously, the methods determine whether a community ML model that is trained by client devices needs to be retrained, and/or whether a global ML model, which is used to generate the community ML model, needs to be retrained.

Further advantageously, embodiments of this disclosure enable consumer devices which do not have depth sensors, but do have at least one camera, to be able to accurately estimate depth of objects in an image or frame captured by that camera. This means that devices which do not currently have the hardware capability to perform depth estimation are provided with a software solution to perform depth estimation in the form of a ML model. The ML model is updated periodically to ensure accuracy of the estimation for all types of captured images/frames.

A yet further advantage of embodiments of this disclosure is that consumer devices that do have depth sensors are provided with a ML model that can provide depth estimation even when the depth sensor has a potential fault or when the depth sensor's limitations prevent the sensor from providing an accurate depth estimate. This means that devices that do have the hardware capability to perform depth estimation are provided with a back-up software solution that can be used to check the accuracy of the sensor's estimations and provide estimates when the sensor is unable to. The ML model is updated periodically to ensure accuracy of the estimation for all types of captured images/frames.

Generally speaking, depth estimation, to obtain a per-pixel depth of an image, can be performed in a number of ways. For example, specialized sensors, such as those based on LIDAR (light detection and ranging) or 3D laser scanning, can be used to determine depth or the distance of an object from the sensor. However, although specialized sensors provide accurate depth estimates, they are expensive and may not be incorporated into many consumer devices, and are prone to hardware issues (that impact the estimates) that may be difficult to fix. Another way to perform depth estimation is by using a machine learning, ML, model to predict depth from a single image or frame captured by an image capture device (e.g. a camera). This is useful because only a single, normal camera is required and the ML model can be periodically updated to improve its accuracy. However, ML models require training on good quality data, and ML models may also suffer from scale issues. Scale issues mean that, for example, an ML model is able to determine the relative positions of objects relative to the image capture device, but does not accurately determine the actual distances of those objects. That is, the ML model can determine that, in an image showing objects A and B, object A is closer to the client device than object B, but does not correctly calculate the distance of the objects.

Figure 1B:
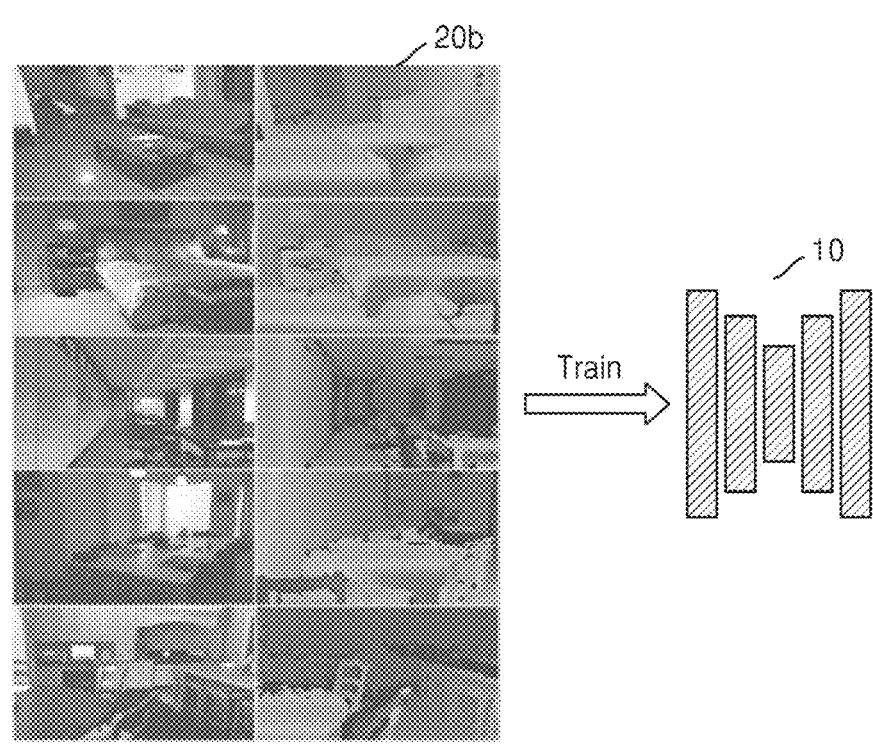
Figure 1C:
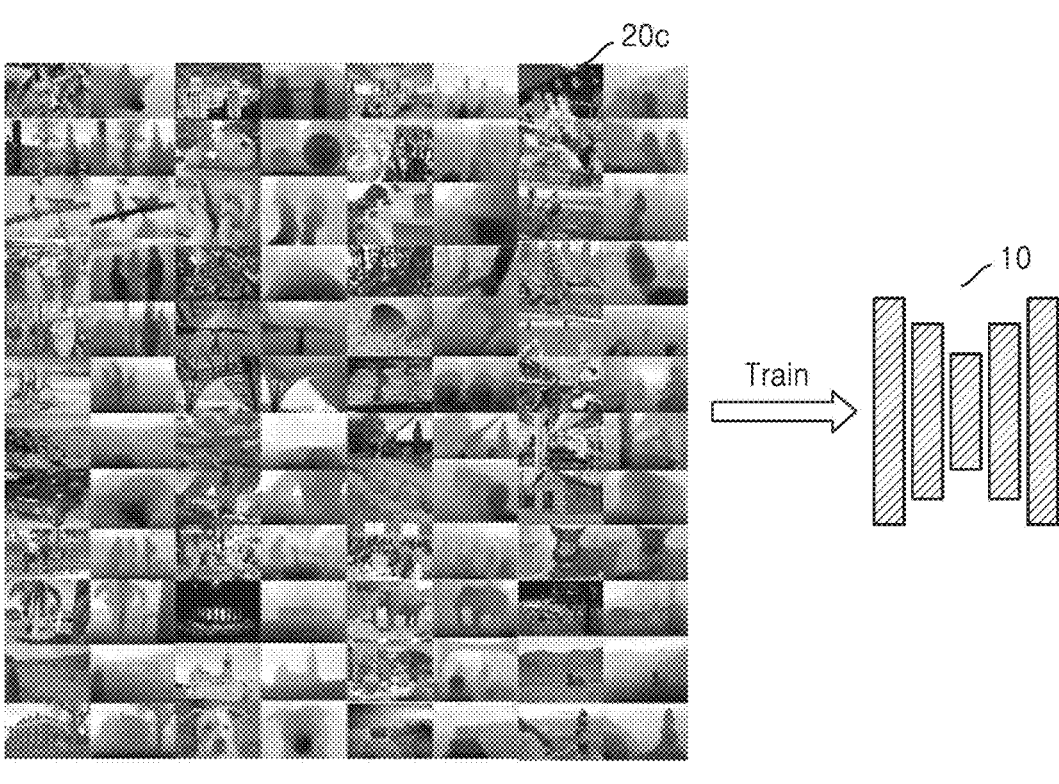

FIGS. 1A to 1C shows existing techniques for training a machine learning, ML, model to perform depth estimation. In FIG. 1A, a limited training dataset 20a is used to train the ML model 10. This may happen because the ML model 10 is trained on-device on only images captured by a user, or because the ML model 10 is trained on images that have been manually labelled with depth information (which are difficult and time-consuming to obtain or produce), for example. However, this leads to poor generalization of the model. That is, the ML model 10 may not be able to accurately estimate depth when presented with an image that does not look like an image it has previously seen during training. In FIG. 1B, a larger training dataset 20b is used to train the ML model 10, but the images in the training dataset are not diverse. For example, the images may have been captured by a user and so, because people tend to take pictures of things they like (e.g. their cat) or of their own environment (e.g. their garden), their biases result in a training dataset that has many images showing similar things. This again leads to poor generalization of the model. In FIG. 1C, a large and diverse training dataset 20c is used to train the ML model 10, which depicts many different types of scenes and objects (e.g. indoor, outdoor, cats and dogs, etc.). This means the model has better generalization capabilities. However, it will take a long time to generate such a large and diverse training dataset and it will take a long time for the data to be annotated/manually labelled so that it is suitable for training. In particular, in view of data privacy requirements that place restrictions on sharing user's images with other devices for generating datasets and training a model, it may take a long time for a single user to generate such a large and diverse training dataset so that they can train a model locally using their own private data.

Thus, it possible to have a good depth estimation model if large and diverse training data exists. As a single user cannot generate sufficient data themselves, one solution would be to combine lots of datasets generated by lots of users, to form a large and diverse training dataset. However, aside from the privacy issues mentioned above, this can lead to scale issues. Each depth sensor that can be used to capture images and predict depth may have different ranges (scales) and accuracies. For example, one sensor may have a sensor range of 0.1 meters to 50 meters, while another sensor may have a range of 0.1 meters to 10 meters. This means that some sensors may miss objects in images completely if they are further away than the maximum sensor range. Some sensors may also have "dead zones" that prevent them dealing with objects that too close, i.e. nearer than the minimum sensor range. This makes it difficult to combine images and depth estimates collated using different devices, and will reduce accuracy of the ML model.

Figure 2:
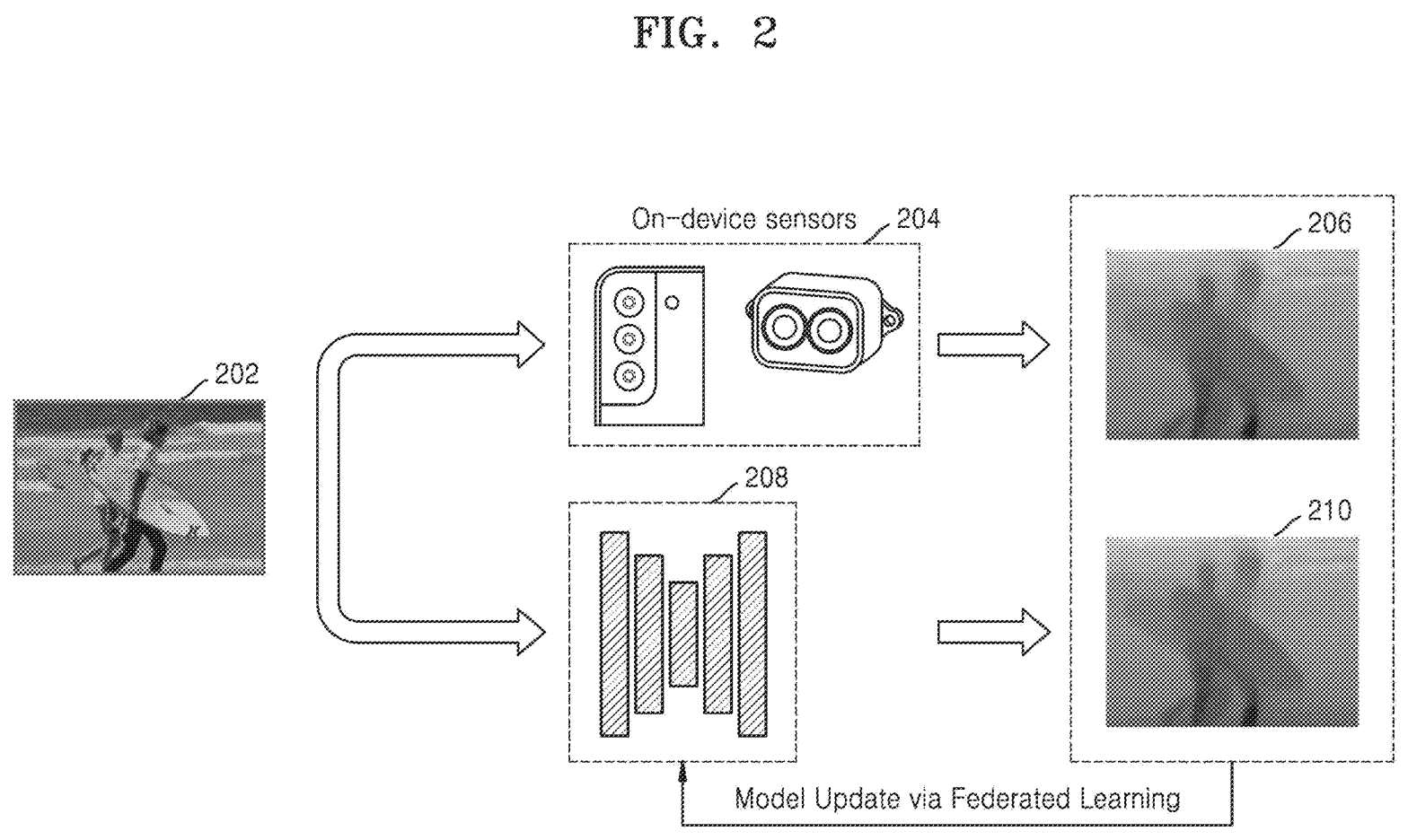

FIG. 2 is a schematic diagram showing an embodiment of this disclosure for training a ML model to perform depth estimation. An embodiments of this disclosure advantageously simultaneously uses a sensor 204 and an ML model 208 to estimate depth of a captured image or frame 202, and uses any difference between the estimates 206, 210 to train/update the ML model 208. Advantageously, embodiments of this disclosure achieve generalization through continually learning using diverse on-device data, avoid data collection issues by selectively creating data using sensors on-device 204, achieve high performance by continually learning from on-device data, and eliminate scale issues by automatically adapting to the scale of any sensor on any device.

Embodiments of this disclosure overcome the above-mentioned issues regarding training data by providing a data generation technique that generates data suitable for training a ML model 208 to perform depth estimation. The training method used herein is federated learning. That is, every device is provided with a version of a global model to train locally. The global model is retained on a central server, and is also updated based on feedback from local training.

Advantageously, the data generation technique of embodiments of this disclosure enables a diverse training dataset to be generated, while maintaining user data privacy. A training dataset is generated on a per-client device basis. That is, each client device that participates in the federated learning process generates its own training dataset to train a local version of a global model. The local model is called a "community" model herein. Advantageously, this means that the images which form the training dataset are retained on the client device, but weights of the model may be shared with other devices and/or a central server to enable other local versions of the global model, or the global model itself, to be updated. Thus, images captured by a large number of client devices are used to train a ML model, without having to share the images themselves. The fact that many client devices are being used to train a ML model itself improves the ML model, as the images captured by the client devices are likely to be diverse.

FIG. 3 is a flowchart of example steps to generate training data suitable for training a ML model to perform depth estimation. The steps shown here may be performed by a client device. The method comprises capturing an image using an image capture device of the client device (step S300). As shown in FIG. 2, the method comprises obtaining for at least one object in the captured image (The captured image may be referred to as a first image): a first depth estimation value obtained by a sensor, and a second depth estimation value calculated by a community ML model, wherein the community ML model is a scaled version of a global ML model (step S302).

The method comprises calculating a set of metrics using the first and second depth estimation values (step S304). A set of metrics may indicate a difference between the first and second depth estimation values. A set of metrics corresponding to captured image may also be referred to as a first set of metrics. Calculating a set of metrics may comprise calculating one or more of: a root mean square error (RMSE), a scale invariant root mean square error (SI-RMSE), an adaptive branch-site random effects likelihood (AbsRel), and a log-likelihood (Log10Rel). It will be understood that these are example, non-limiting metrics that can be used to assess whether an incoming image is suitable for further training the community ML model (and potentially the global ML model).

Figure 4:
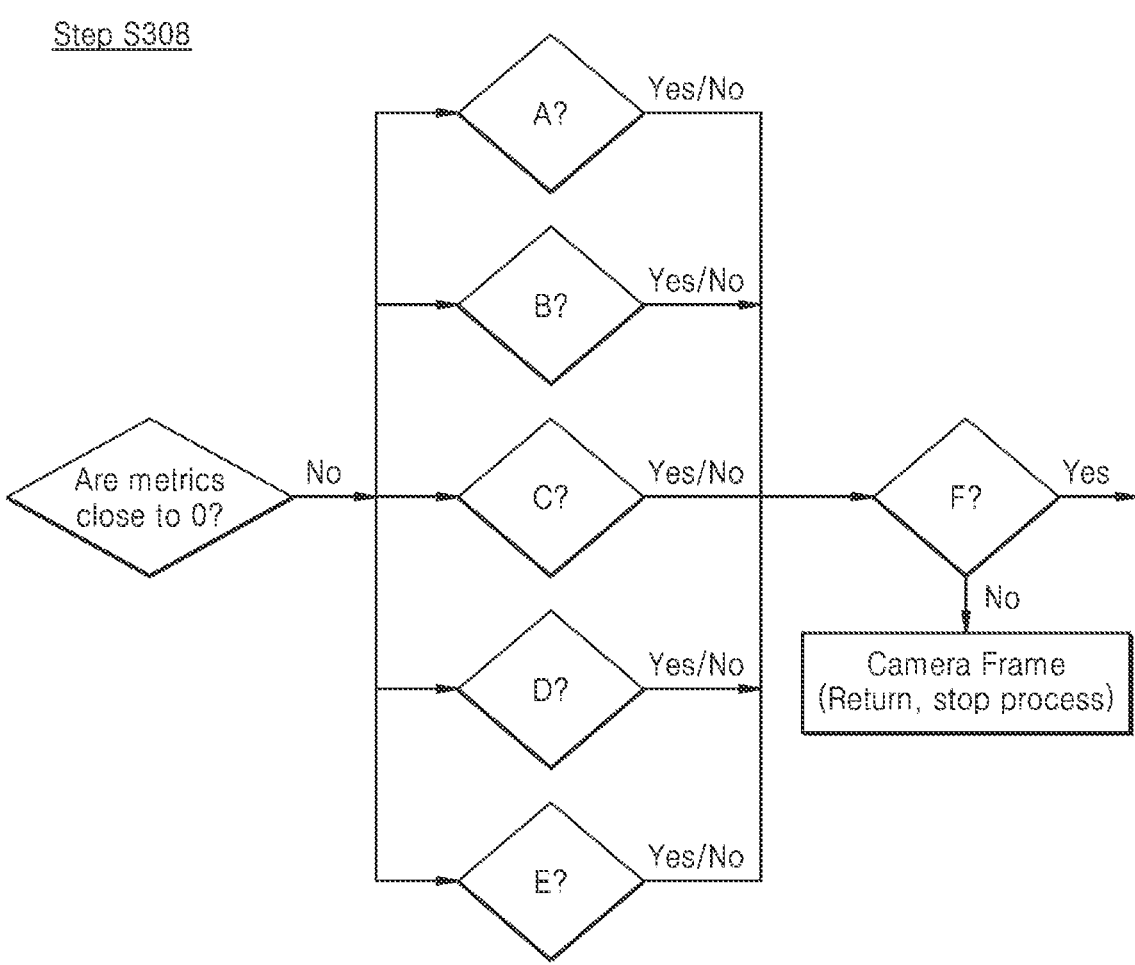
FIG. 4 is a schematic diagram showing how to determine whether similar images exist in a training dataset.

The method comprises determining whether a value of each metric in the set of metrics is close to zero (step S306). In this disclosure, "a value of each metric in the set of metrics is close to zero" may indicate "a value of each metric in the set of metrics is smaller than a threshold value". The threshold value may be predefined. The threshold value may converge to zero. If the metrics are close to zero, the captured image is not suitable for addition to the training dataset, and the method returns to step S300. If the metrics are not close to zero, the method comprises determining whether images with similar metrics are present within a database of the client device, the database forming a training dataset for further training of the community ML model (step S308). In other words, If the metrics are not close to zero, the method comprises whether the similarity between the first set of metrics and a second set of metrics corresponding to the second image from among images within a database of the client device is greater than a threshold value, the database forming a training dataset for further training of the community ML model. The threshold value may be predefined. FIG. 4 is a schematic diagram showing how to determine whether similar images exist in a training dataset. As shown in FIG. 4, a number of metrics A to E may be calculated for each incoming pair of depth estimates (i.e. the depth estimate from the sensor and depth estimate from the community ML model). The metrics A to E may be some of the metrics mentioned above with respect to step S304. The method may comprise fast searching through the database to determine if there is an image with similar or the same metrics. If the incoming captured image is similar in most metrics (e.g. four out of five metrics), then the method may comprise determining that the captured image is similar to an image in the database. The captured image is therefore not added to the database. If the sample is not similar to anything in the database (e.g. only one out of five metrics is the same), then the method may comprise adding that captured image to the database.

Returning to FIG. 3, if images with similar metrics already exist in the database, then the captured image does not make the training dataset more diverse and is therefore not useful. In this case, the method returns to step S300. However, if images with similar metrics do not already exist in the training dataset, then the method comprises storing metadata associated with the captured image or the captured image itself in the database of the client device (step S310). This is because the captured image is different to existing images in the training dataset and so is valuable for training purposes.

Storing metadata associated with the captured image may comprise storing one or more of: a location of the captured image in storage, an identifier of the captured image, the calculated set of metrics, a value of a difference between the first metric and second metric, a flag indicating a structural error, and a flag indicating a scale error. Thus, in some cases, the captured image that is suitable for training is not itself added to the database. The captured image may be stored elsewhere on the client device (such as in the photo gallery of the client device), and information identified the captured image is stored in the database to avoid duplicating images and using-up valuable storage space. The metrics and/or flags may be stored to enable incoming images to be readily compared with images that already form the training dataset, which as explained above, enables the suitability of the incoming image for training purposes to be determined.

Figure 5:
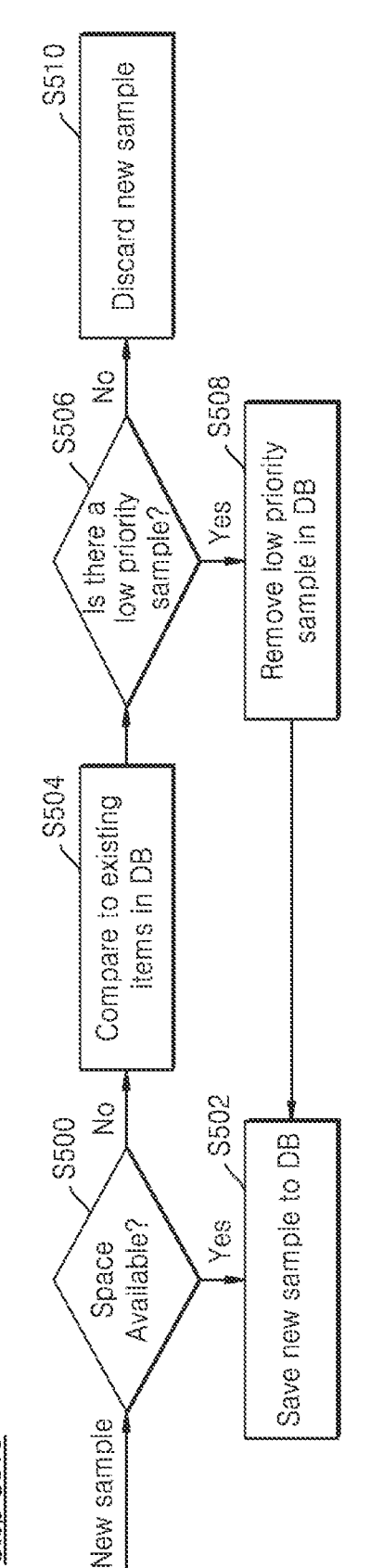
FIG. 5 is flowchart of example steps to determine whether to add a captured image to a training dataset.

As noted above, in some cases the captured image that is determined to be suitable for addition to the training dataset is not itself stored in the database, to save storage space. However, in other cases, the image may be stored. Turning to FIG. 5, this shows a flowchart of example steps to determine whether to add a captured image to a training dataset. As shown in FIG. 5, the data generation method may further comprise storing the captured image alongside the metadata. Preferably therefore, when the captured image is to be stored, the data generation method comprises determining whether there is sufficient space in the database to store the captured image (step S500). In other words, the data generation method comprises determining whether free space in the database is greater than a threshold value indicating sufficient space in the database to store the captured image (step S500). When it is determined there is sufficient space in the database to store the captured image, the method further comprises: saving the captured image in the database (step S502). When it is determined there is insufficient space in the database to store the captured image, the method further comprises: comparing the metadata associated with the captured image with the metadata stored in the database (step S504); identifying whether there is a lower priority image in the database (step S506); and removing the lower priority image (step S508) and saving the captured image in the database (step S502), when a lower priority image is identified. That is, as explained above, the images in the database may be associated with a priority based on the type of error they indicate, and this priority may be used to determine whether to retain an image in the database (step S510) or to replace it with an incoming image with a higher priority (step S508). This improves the diversity and usefulness of the training dataset.

Figure 6:
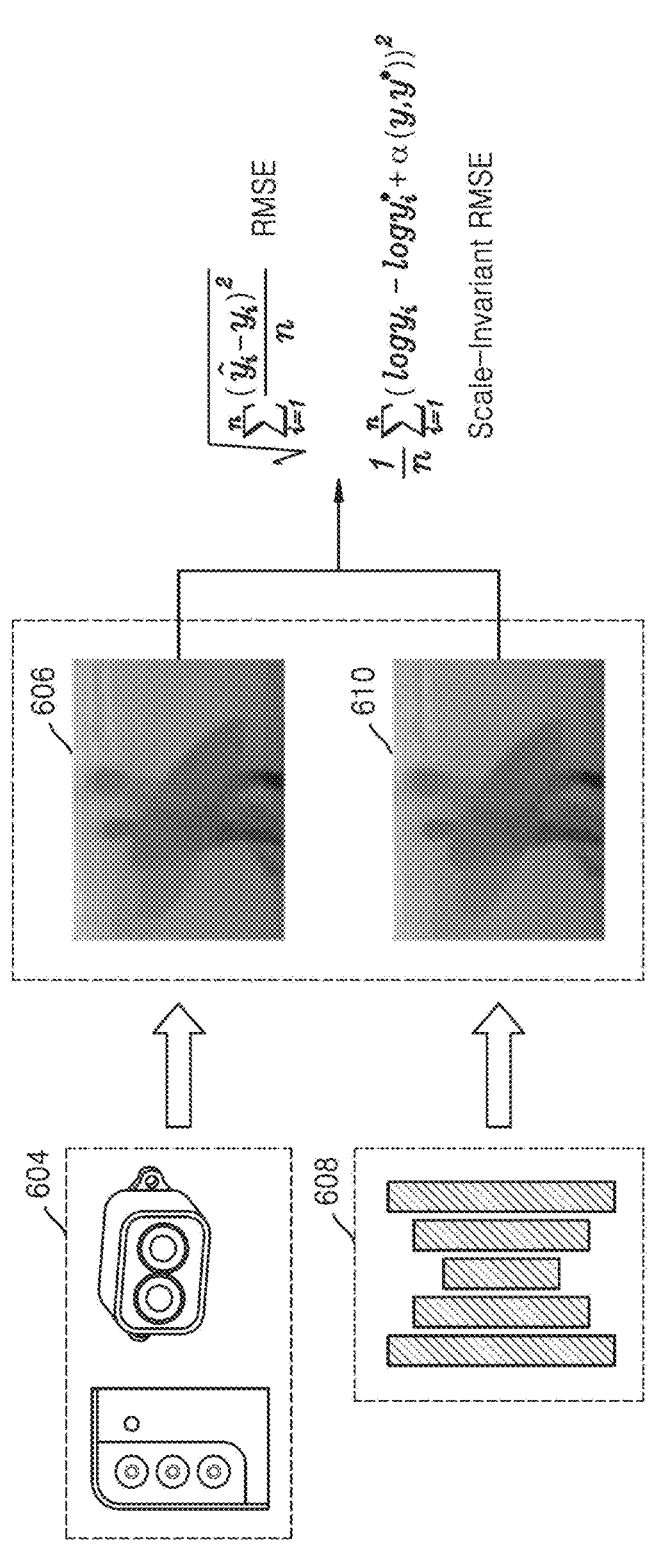
FIG. 6 is a schematic diagram illustrating two metrics that may be calculated to determine whether a community ML model or a global ML model needs training.

In FIG. 3, at step S304 two specific metrics may be calculated. FIG. 6 is a schematic diagram illustrating two metrics corresponding to a depth estimate 206 using on-device sensor 204 and a depth estimate 210 using ML model 208 that may be calculated to determine whether a community ML model or a global ML model needs training. Calculating the first metric may comprises calculating a scale-invariant root mean square error, SI-RMSE, using the first and second depth estimation values, and calculating the second metric comprises calculating a root mean square error, RMSE, using the first and second depth estimation values. It will be understood that these are examples of the first and second metric, and any suitable metric may be used. For example, the first metric may be a structural similarity index measure, SSIM.

The data generation method may further comprise determining whether a value of a first metric of the set of metrics indicates there are structural errors in the community model that require the global model to be retrained. In this case, the step of storing metadata or the image (step S310) may also comprise storing a flag indicating a structural error when the value of the first metric indicates there are structural errors.

The data generation method may further comprise determining whether a value of a second metric of the set of metrics indicates there are scale errors in the community model that require the community model to be retrained. In this case, the step of storing metadata or the image (step S310) may also comprise storing a flag indicating a scale error when the value of the second metric indicates there are structural errors.

Scale issues generally indicate a problem with the training of the community ML model. Scale issues mean that, for example, the community ML model is able to determine the relative positions of objects relative to the client device (or image capture device thereof), but does not accurately determine the actual distances of those objects. That is, the community ML model can determine that, in an image showing objects A and B, object A is closer to the client device than object B, but does not correctly calculate the distance of the objects. A scaling issue usually relates to issues with the community ML model. Scaling issues are considered the lowest priority error. In contrast, structural issues generally indicate a problem with the training of the global ML model. Structural issues mean that, for example, the model does not know how to correctly order the objects A and B in depth space, or completely misses an object from the image. These issues indicate problems with the global model as it is having difficulty identifying and dealing with objects in the image, and suggests the global model has not been trained on a diverse training dataset. Similarly, an image may indicate structural and scaling issues. This is considered the highest priority error. Thus, the value of a captured image for the purpose of training may depend on the priority of the error. Captured images that lead to the highest priority error are more valuable than images that lead to the lowest priority error and those which have no error at all.

Once a training dataset has been generated, it can be used to train the ML model. It should be noted that the training dataset is not necessarily static. The generated training dataset can be added to when suitable images are captured by the client device, which enables the size and diversity of the training dataset to be improved, which in turn enables the ML model to be updated and improved.

Figure 7:
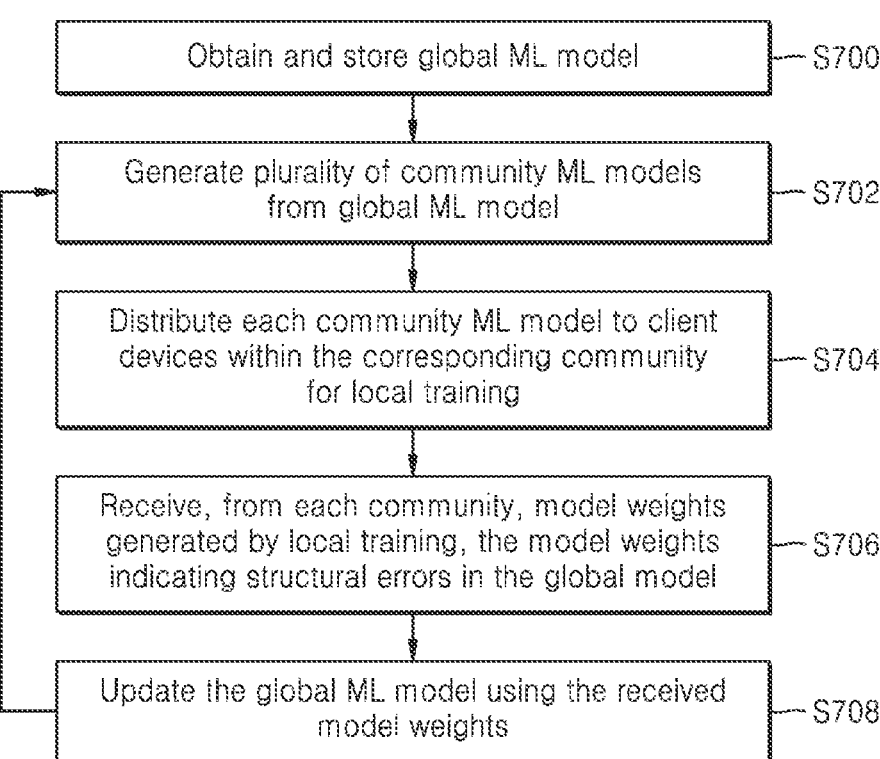
FIG. 7 is a flowchart of example steps performed by a central server to train a global ML model.

FIG. 7 is a flowchart of example steps performed by a central server to train a global ML model. As mentioned above, each client device enrolled in the federated learning process trains a local version of a global model. Specifically, each client device trains a community ML model, which is a scaled version of a global ML model. The global ML model is stored by a central server. The central server is responsible for generating and distributing the scaled version of the global ML model to the client devices. Since client devices have different specifications and processing capabilities, client devices are grouped into communities, where the devices within a community have similar properties. For example, all client devices that are high-end/top-tier smartphones may be grouped together in a community, while client devices that are wearable devices with limited processing resource may be grouped together in another community. The central server then generates community models based on the global ML model, based on the computation properties of the client devices within each community, and distributes these community models for local training. As mentioned above, when the local training by the client devices indicates that there is a structural problem in the global ML model, the client devices send model weights to the central server, and the central server retrains the global ML model using the received model weights. This ensures that structural errors are addressed centrally and that all communities receive an updated community model based on the retrained global ML model.

Thus, the method performed by the central server, for training a machine learning, ML, model using federated learning to perform depth estimation, comprises: obtaining and storing a global ML model for training (step S700). The method comprises generating a plurality of community models from the global ML model, wherein each community model is a scaled version of the global ML model that has been scaled based on computation properties of client devices within the community (step S702).

The method comprises distributing each community model to the client devices within the corresponding community for local training by the client devices (step S704). Once the client devices have performed local training, the method comprises receiving, from each community, model weights generated by the local training, wherein the model weights indicate structural errors in the model that require the global model to be retrained (step S706). The method comprises updating the global ML model using the received model weights (step S708).

The method may further comprise: regenerating the plurality of community models based on the updated global ML model; and distributing each updated community model to the corresponding community. This ensures that the global model is updated and all the corresponding community models are updated, and any further local training by the client devices is performed relative to the updated community models.

Figure 8:
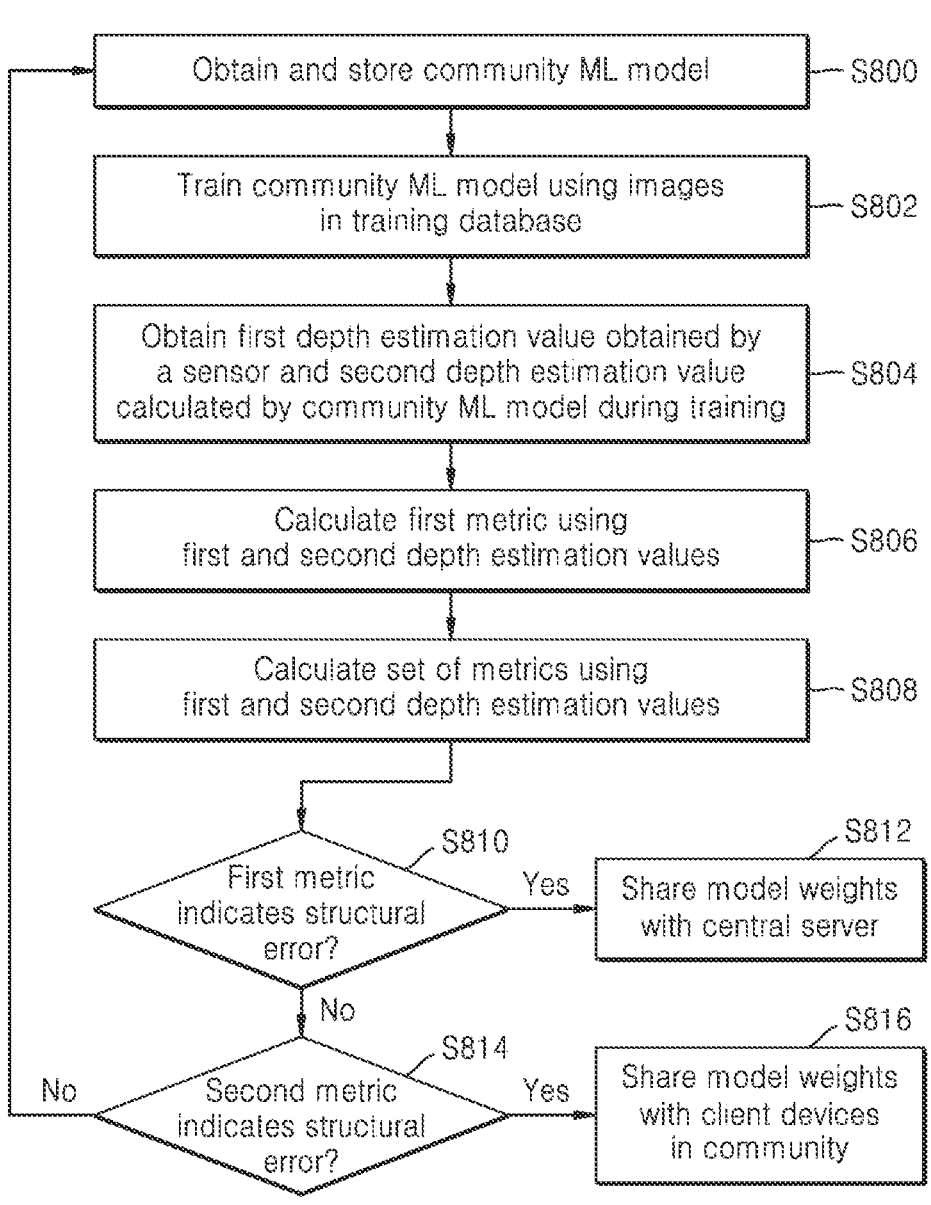
FIG. 8 is a flowchart of example steps performed by a client device to determine whether a community ML model or a global ML model needs training.

FIG. 8 is a flowchart of example steps performed by a client device to determine whether a community ML model or a global ML model needs training Advantageously, as mentioned above, the training method performed by the client device highlights whether there are any scale errors in the community model, any structural errors in the global model, or both scale errors and structural errors. The model weights are then shared with other devices in the community and/or with the central server to enable retraining of the appropriate model. A benefit of only sharing model weights with other client devices in a community when there is a scale error is that it makes more efficient use of bandwidth. Scale errors are likely due to the properties of the client devices, and therefore, client devices in other communities will not be affected in the same way. In contrast, structural errors impact all devices and therefore, it is more efficient to send model weights to the central server so that the global model can be updated than to send model weights to every client device or to every community.

The method, performed by a client device, for training a machine learning, ML, model using federated learning to perform depth estimation, comprises: obtaining and storing a community ML model for training by a community of client devices, wherein the community ML model is a scaled version of a global ML model (step S800). It will be appreciated that this step need not be performed every time the ML model is trained, as the client device may already have a community model to train. In this case, step S800 refers to obtaining the community model from storage on the client device.

The method comprises training the community ML model based on a training database on the client device, the training database comprising suitable images captured by an image capture device of the client device (step S802). The training database is the training database that is generated using the process described above with reference to FIG. 3.

The method comprises obtaining for at least one object in an image: a first depth estimation value obtained by the sensor, and a second depth estimation value calculated by the community ML model (step S804).

The method comprises calculating a first metric using the first and second depth estimation values, wherein a value of the first metric indicates whether there are structural errors in the community model that require the global model to be retrained (step S806), and calculating a second metric using the first and second depth estimation values, wherein a value of the second metric indicates whether there are scale errors in the community model that require the community model to be retrained (step S808).

Calculating the first metric (step S806) may comprise calculating a scale-invariant root mean square error, SI-RMSE, using the first and second depth estimation values, and calculating the second metric (step S808) may comprise calculating a root mean square error, RMSE, using the first and second depth estimation values. It will be understood that these are examples of the first and second metric, and any suitable metric may be used. For example, the first metric may be a structural similarity index measure, SSIM.

Figure 10:
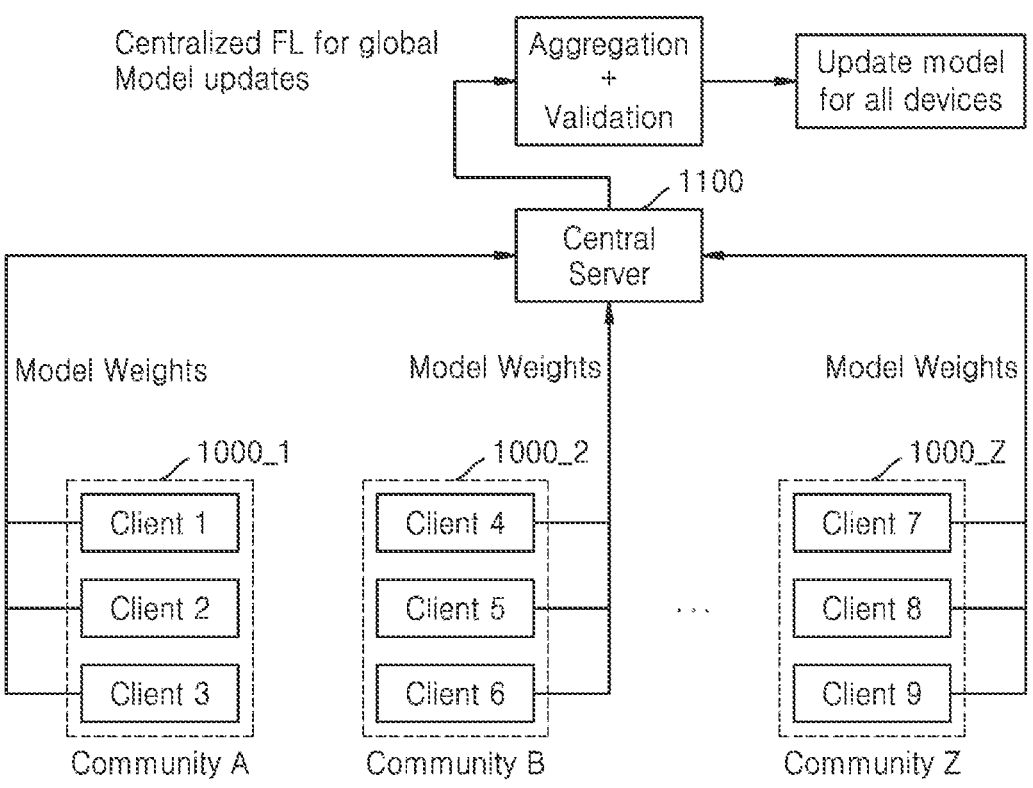
FIG. 10 is a schematic diagram illustrating an embodiment to train a global ML model.

The method comprises determining whether a value of the first metric indicates there are structural errors (step S810); and if so, sharing model weights generated by the training with a central server for updating the global model (step S812). This leads to step S706 of FIG. 7. Sharing model weights generated by the training with a central server (step S812) may comprise: transmitting model weights to a central server for aggregation, thereby enabling the central server to update the global ML model upon which the community ML model is based. FIG. 10 is a schematic diagram illustrating an embodiment to train a global ML model. As shown, model weights from each community 1000_1, 1000_2, . . . , or 1000_Z (Z may be a natural number) of devices are transmitted to the central server 1100. The central server 1100 may aggregate and validate the incoming data and use this to update the global ML model. The global ML model is then used to regenerate community ML models that can be provided back to the communities of devices.

If there are no structural errors, the method comprises determining whether a value of the second metric indicates there are scale errors (step S814), and if so, sharing model weights generated by the training with other client devices in the community (step S816).

Figure 9:
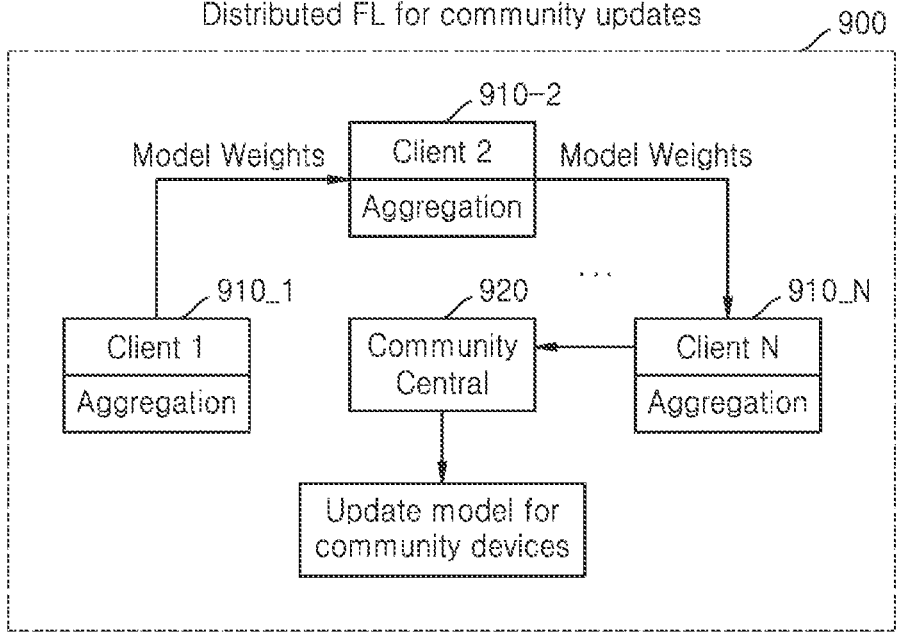
FIG. 9 is a schematic diagram illustrating an embodiment to train a community ML model.

Sharing model weights generated by the training with other client devices in the community (step S816) may comprise: transmitting model weights to at least one other client device using a peer-to-peer distribution mechanism, thereby enabling each client device to update their stored community ML model. In this case, each client device may be responsible for aggregating model weights and updating its own community model. FIG. 9 shows this peer-to-peer distribution.

Alternatively, sharing model weights generated by the training with other client devices in the community (step S816) may comprise: transmitting model weights to a community central server for aggregation, thereby enabling the community central server to update the community ML model and distribute an updated community central server to the client devices in the community. The community central server may perform a similar function to the central server, except with respect to a single community rather than all communities. The community central server may aggregate all received model weights from the client devices in the community, and use this to update the community ML model. The updated community ML model may then be distributed by the community central server to all client devices in the community. FIG. 9 shows how a community central server 920 may aggregate weights and update the community ML model. The community central server 920 may receive the weights from a single device 910_1, 910_2, . . . , or 910_N (N may be a natural number) which has received updates from other devices using peer-to-peer distribution, as shown. Alternatively, each client device may send its own weights to the community central server directly (not shown). In some cases, the community central server 920 may not be a separate server, but may instead be one client device of the plurality of client devices 910_1, 910_2, . . . , and 910_N. This client device may assume the role of a community central server and aggregate model weights received from other client devices in the community. Thus, the term "community central server" used herein encompasses both a dedicated server and a client device acting as a server.

If there are no scale errors, the method of FIG. 8 returns to step S800. That is, if there are neither structural nor scale issues, the model weights do not need to be shared with any other device in the system as they are not indicative of errors that require community-level or global-level retraining of the corresponding model.

When the scale-invariant root mean square error, SI-RMSE, is low and the root mean square error, RMSE, is high, the community ML model may have a scale error.

When the scale-invariant root mean square error, SI-RMSE, is high and the root mean square error, RMSE, is low, the community ML model may have a structural error.

When the scale-invariant root mean square error, SI-RMSE, is high and the root mean square error, RMSE, is high, the community ML model may have a scale error and a structural error.

The training method performed by the client device may further comprise: checking, prior to training the community ML model (i.e. prior to step S802), whether the client device is able to train the community ML model. That is, when the client device is instructed to train the community ML model, the client device may not automatically begin the training but may instead perform checks to determine whether the client device is able to train. The checking may comprise checking at least that there are images in the training database to be used for training, and that an operational state of the client device is suitable for training Checking the operational state of the client device may comprise checking a temperature of the client device, whether the client device is charging (i.e. whether a battery-operated device is plugged into a mains power supply or is running using the battery power), the current CPU and/or GPU usage, and whether there is training data on the client device that can be used for training.

The training method performed by the client device may further comprise: receiving, prior to training (i.e. prior to step S802), a request to train the community ML model from the central server, from another client device in the community, or from a community central server. In other words, the client device may only begin training in response to receiving a request to perform training. Even if the request is received, the client device may begin training only if the checks mentioned above indicate the client device is currently able to participate in training.

Figure 11:
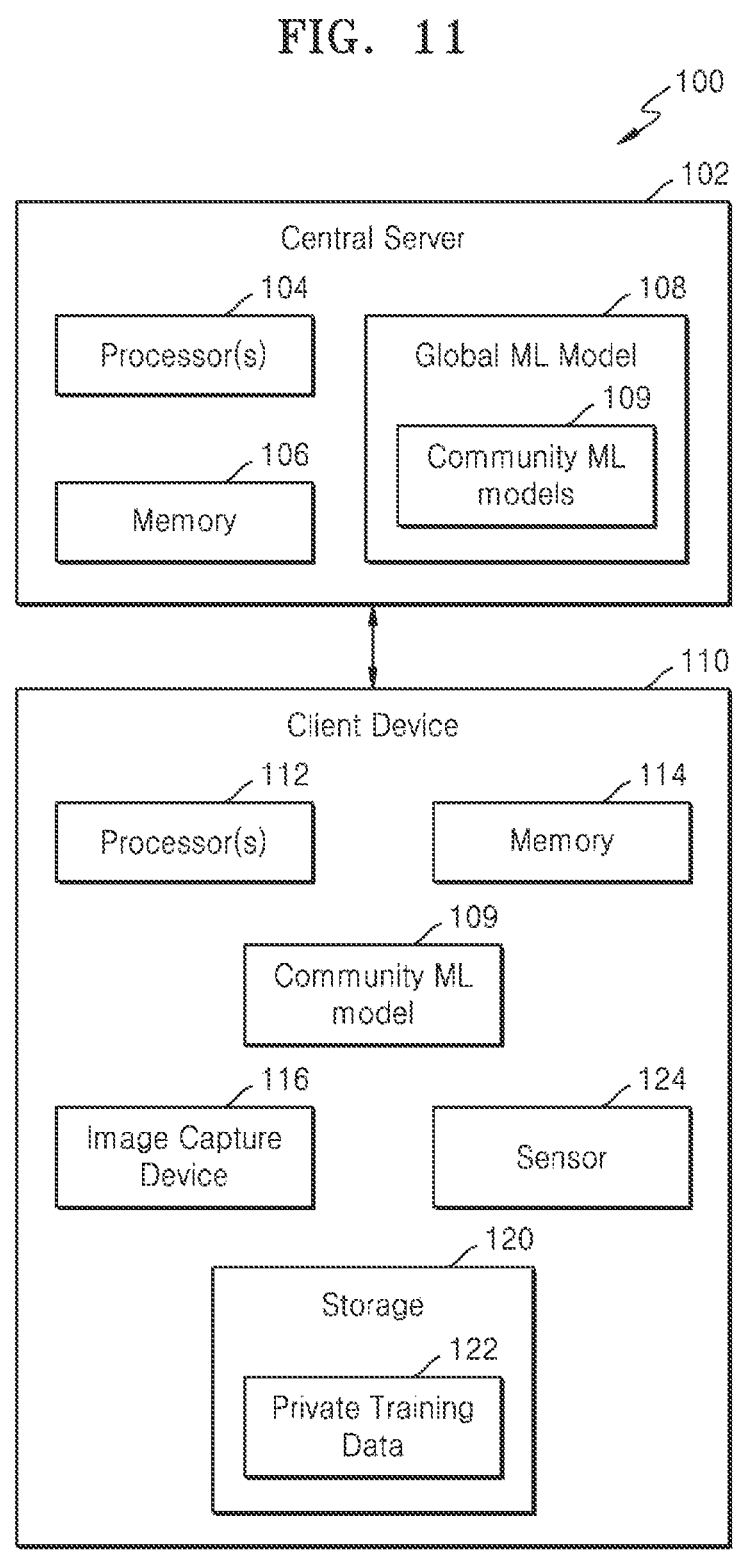

FIG. 11 is block diagram of a system for training a ML model using federated learning to perform depth estimation. The system 100 comprises a central server 102, and a plurality of client devices or apparatuses 110. For the sake of simplicity, a single apparatus 110 is shown here.

The server 102 comprises at least one processor 104 coupled to memory 106. The at least one processor 104 may comprise one or more of: a microprocessor, a microcontroller, and an integrated circuit. The memory 106 may comprise volatile memory, such as random access memory (RAM), for use as temporary memory, and/or non-volatile memory such as Flash, read only memory (ROM), or electrically erasable programmable ROM (EEPROM), for storing data, programs, or instructions, for example.

The server 102 stores a global ML model 108, which is to be trained using federated learning and the plurality of apparatus 110.

The at least one processor 104 coupled to memory 106 may be arranged to: obtain and storing a global ML model 108 for training; generate a plurality of community models 109 from the global ML model 108, wherein each community model is a scaled version of the global ML model that has been scaled based on computation properties of client devices within the community; distribute each community model 109 to the client devices 110 within the corresponding community for local training by the client devices; receive, from each community, model weights generated by the local training, wherein the model weights indicate structural errors in the model 108 that require the global model 108 to be retrained; and updating the global ML model 108 using the received model weights.

The apparatus 110 may be any one of: a smartphone, tablet, laptop, computer or computing device, virtual assistant device, a vehicle, a drone, an autonomous vehicle, a robot or robotic device, a robotic assistant, image capture system or device, an augmented reality system or device, a virtual reality system or device, a gaming system, an Internet of Things device, a smart consumer device, a smartwatch, a fitness tracker, and a wearable device. It will be understood that this is a non-exhaustive and non-limiting list of example apparatus.

Each client device or apparatus 110 may comprise at least one processor 112 coupled to memory 114. The at least one processor 112 may comprise one or more of: a microprocessor, a microcontroller, and an integrated circuit. The memory 114 may comprise volatile memory, such as random access memory (RAM), for use as temporary memory, and/or non-volatile memory such as Flash, read only memory (ROM), or electrically erasable programmable ROM (EEPROM), for storing data, programs, or instructions, for example.

Each apparatus 110 receives a community model 109 for training locally, from the server 102, based on the hardware capabilities of the apparatus (i.e. the memory capacity of memory 114 and processing capability of processor(s) 112). Each apparatus 110 may also be grouped into a community based on the hardware specifications of its image capture device 116. The apparatus comprises storage 120 for storing private training data 122 collected or obtained by the apparatus 110. The private training data 122 may be images, videos, or frames of videos.

The apparatus 110 may further comprising at least one image capture device 116 for capturing images or videos to be used as the private training data.

The processor 112 of the apparatus 110 may be arranged to perform the methods described above with respect to FIG. 3 (data generation) and FIG. 8 (training). For the sake of simplicity, these methods are not described again here.

The apparatus 110 may comprise a sensor 124, for obtaining a first depth estimation value. The sensor 124 may be a depth sensor, time-of-flight sensor, a sensor comprising multiple cameras, or any other suitable device for capturing the ground-truth (i.e. first depth estimation value). The sensor may be activated or sensing data when an image capture device is capturing an image, such that the captured image and the sensor data are related. A first depth estimation value may be obtained by a sensor.

Further embodiments of this disclosure are set out in the following numbered clauses:

1. A computer-implemented method, performed by a client device, for generating a training dataset for training a machine learning, ML, model using federated learning to perform depth estimation, the method comprising: capturing an image using an image capture device of the client device; obtaining for at least one object in the captured image: a first depth estimation value obtained by a sensor, and a second depth estimation value calculated by a community ML model, wherein the community ML model is a scaled version of a global ML model; calculating a set of metrics using the first and second depth estimation values; determining whether a value of each metric in the set of metrics is close to zero; and determining, when the value of each metric is not close to zero, whether images with similar metrics are present within a database of the client device, the database forming a training dataset for further training of the community ML model.

2. The method according to clause 1 further comprising: storing metadata associated with the captured image in the database of the client device when there are no images with similar first and second metrics in the database.

3. The method according to clause 2 further comprising: determining whether a value of a first metric of the set of metrics indicates there are structural errors in the community model that require the global model to be retrained; wherein storing metadata comprises storing a flag indicating a structural error when the value of the first metric indicates there are structural errors.

4. The method according to clause 2 or 3 further comprising: determining whether a value of a second metric of the set of metrics indicates there are scale errors in the community model that require the community model to be retrained; wherein storing metadata comprises storing a flag indicating a scale error when the value of the second metric indicates there are structural errors.

5. The method according to clause 2, 3 or 4 wherein storing metadata associated with the captured image comprises storing one or more of: a location of the captured image in storage, an identifier of the captured image, the calculated set of metrics, a value of a difference between the first metric and second metric, a flag indicating a structural error, and a flag indicating a scale error.

6. The method according to clause 4 or 5 wherein calculating the first metric comprises calculating a scale-invariant root mean square error using the first and second depth estimation values, and calculating the second metric comprises calculating a root mean square error using the first and second depth estimation values.

7. The method according to any preceding clause wherein calculating a set of metrics comprises calculating one or more of: a root mean square error, a scale invariant root mean square error, an adaptive branch-site random effects likelihood, and a log-likelihood.

8. The method according to any of clauses 2 to 7 further comprising: storing the captured image alongside the metadata.

9. The method according to clause 8 further comprising: determining whether there is sufficient space in the database to store the captured image; and when it is determined there is insufficient space in the database to store the captured image, the method further comprises: comparing the metadata associated with the captured image with the metadata stored in the database; identifying whether there is a lower priority image in the database; and removing the lower priority image and saving the captured image or associated metadata in the database, when a lower priority image is identified.

10. A client device for generating a training dataset for training a machine learning, ML, model using federated learning to perform depth estimation, the client device comprising: an image capture device; a sensor; storage comprising: a community ML model for training by the client device, wherein the community ML model is a scaled version of a global ML model, and a database forming a training dataset for training of the community ML model; and at least one processor coupled to memory and arranged to: receive an image captured using the image capture device; obtain for at least one object in the captured image: a first depth estimation value obtained by the sensor, and a second depth estimation value calculated by a community ML model, wherein the community ML model is a scaled version of a global ML model; calculate a set of metrics using the first and second depth estimation values; determine whether a value of each metric in the set of metrics is close to zero; and determine, when the value of each metric is not close to zero, whether images with similar metrics are present within a database of the client device, the database forming a training dataset for further training of the community ML model.

11. A computer-implemented method, performed by a server, for training a machine learning, ML, model using federated learning to perform depth estimation, the method comprising: obtaining and storing a global ML model for training; generating a plurality of community models from the global ML model, wherein each community model is a scaled version of the global ML model that has been scaled based on computation properties of client devices within the community; distributing each community model to the client devices within the corresponding community for local training by the client devices; receiving, from each community, model weights generated by the local training, wherein the model weights indicate structural errors in the model that require the global model to be retrained; and updating the global ML model using the received model weights.

12. The method according to clause 11 further comprising: regenerating the plurality of community models based on the updated global ML model; and distributing each updated community model to the corresponding community.

13. A computer-implemented method, performed by a client device, for training a machine learning, ML, model using federated learning to perform depth estimation, the method comprising: obtaining and storing a community ML model for training by a community of client devices, wherein the community ML model is a scaled version of a global ML model; training the community ML model based on a training database on the client device, the training database comprising suitable images captured by an image capture device of the client device; obtaining for at least one object in an image from the training database: a first depth estimation value obtained by a sensor, and a second depth estimation value calculated by the community ML model during the training; calculating a first metric using the first and second depth estimation values, wherein a value of the first metric indicates whether there are structural errors in the community model that require the global model to be retrained; calculating a second metric using the first and second depth estimation values, wherein a value of the second metric indicates whether there are scale errors in the community model that require the community model to be retrained; and sharing model weights generated by the training with: a central server for updating the global model when the value of the first metric indicates there are structural errors, and other client devices in the community when a value of the second metric indicates there are scale errors.

14. The method according to clause 13 wherein sharing model weights generated by the training with other client devices in the community comprises: transmitting model weights to at least one other client device using a peer-to-peer distribution mechanism, thereby enabling each client device to update their stored community ML model.

15. The method according to clause 13 wherein sharing model weights generated by the training with other client devices in the community comprises: transmitting model weights to a community central server for aggregation, thereby enabling the community central server to update the community ML model and distribute an updated community central server to the client devices in the community.

16. The method according to any of clauses 13 to 15 wherein sharing model weights generated by the training with a central server comprises: transmitting model weights to a central server for aggregation, thereby enabling the central server to update the global ML model upon which the community ML model is based.

17. The method according to any of clauses 13 to 16 wherein calculating the first metric comprises calculating a scale-invariant root mean square error using the first and second depth estimation values, and wherein calculating the second metric comprises calculating a root mean square error using the first and second depth estimation values.

18. The method according to clause 17 wherein when the scale-invariant root mean square error is low and the root mean square error is high, the community ML model has a scale error.

19. The method according to clause 17 wherein when the scale-invariant root mean square error is high and the root mean square error is low, the community ML model has a structural error.

20. The method according to clause 17 wherein when the scale-invariant root mean square error is high and the root mean square error is high, the community ML model has a scale error and a structural error.

21. The method according to any of clauses 13 to 20 further comprising: checking, prior to training the community ML model, whether the client device is able to train the community ML model.

22. The method as according to clause 21 wherein the checking comprises checking at least that there are images in the training database to be used for training, and that an operational state of the client device is suitable for training.

23. The method according to any of clauses 13 to 22 further comprising: receiving, prior to training, a request to train the community ML model from the central server, from another client device in the community, or from a community central server.

24. A non-transitory data carrier carrying code which, when implemented on a processor, causes the processor to carry out the method of any of clauses 1 to 23.

25. A system for training a machine learning, ML, model using federated learning to perform depth estimation, the system comprising: a central server comprising at least one processor coupled to memory, wherein the central server is arranged to: obtain and storing a global ML model for training; generate a plurality of community models from the global ML model, wherein each community model is a scaled version of the global ML model that has been scaled based on computation properties of client devices within the community; and distribute each community model to the client devices within the corresponding community for local training by the client devices; and a plurality of client device communities, wherein each community comprises a plurality of client devices that are grouped together based on having similar computation properties, wherein each client device comprises at least one processor coupled to memory and is arranged to: receive, from the central server, a community ML model for training; train the community ML model based on a training database on the client device, the training database comprising suitable images captured by an image capture device of the client device; obtain for at least one object in an image: a first depth estimation value obtained by the sensor, and a second depth estimation value calculated by the community ML model; calculate a first metric using the first and second depth estimation values, wherein a value of the first metric indicates whether there are structural errors in the community model that require the global model to be retrained; calculate a second metric using the first and second depth estimation values, wherein a value of the second metric indicates whether there are scale errors in the community model that require the community model to be retrained; and share model weights generated by the training with: a central server for updating the global model when the value of the first metric indicates there are structural errors, and other client devices in the community when a value of the second metric indicates there are scale errors, wherein the central server is further arranged to: receive, from each community, model weights generated by the local training, wherein the model weights indicate structural errors in the model that require the global model to be retrained; and update the global ML model using the received model weights.

26. The system according to clause 25 wherein the central server is arranged to: regenerate the plurality of community models based on the updated global ML model; and distribute each updated community model to the corresponding community.

27. The system according to clause 25 or 26 wherein the client device is arranged to share model weights generated by the training with other client devices in the community by: transmitting model weights to at least one other client device using a peer-to-peer distribution mechanism, thereby enabling each client device to update their stored community ML model.

28. The system according to clause 25 or 26 wherein the client device is arranged to share model weights generated by the training with other client devices in the community by: transmitting model weights to a community central server for aggregation, thereby enabling the community central server to update the community ML model and distribute an updated community central server to the client devices in the community.

29. The system according to any of clauses 25 to 28 wherein the client device is arranged to share model weights generated by the training with the central server by: transmitting model weights to a central server for aggregation, thereby enabling the central server to update the global ML model upon which the community ML model is based.

30. The system according to any of clauses 25 to 29 wherein the client device is arranged to calculate the first metric by calculating a scale-invariant root mean square error using the first and second depth estimation values, and to calculate the second metric by calculating a root mean square error using the first and second depth estimation values.

31. The system according to clause 30 wherein when the scale-invariant root mean square error is low and the root mean square error is high, the community ML model has a scale error.

32. The system according to clause 30 wherein when the scale-invariant root mean square error is high and the root mean square error is low, the community ML model has a structural error.

33. The system according to clause 30 wherein when the scale-invariant root mean square error is high and the root mean square error is high, the community ML model has a scale error and a structural error.

34. The system according to any of clauses 25 to 33 wherein the processor of the client device is arranged to: check, prior to training the community ML model, whether the client device is able to train the community ML model.

35. The system according to clause 34 wherein the checking comprises checking at least that there are images in the training database to be used for training, and that an operational state of the client device is suitable for training.

36. The system according to any of clauses 25 to 35 wherein the processor of the client device is arranged to: receive, prior to training, a request to train the community ML model from the central server, from another client device in the community, or from a community central server.

37. A client device for training a machine learning, ML, model using federated learning, the client device comprising: at least one processor coupled to memory and arranged to: receive, from a central server, a community ML model for training, wherein the community ML model is a scaled version of a global ML model; train the community ML model based on a training database on the client device, the training database comprising suitable images captured by an image capture device of the client device; obtain for at least one object in an image: a first depth estimation value obtained by a sensor of the client device, and a second depth estimation value calculated by the community ML model; calculate a first metric using the first and second depth estimation values, wherein a value of the first metric indicates whether there are structural errors in the community model that require the global model to be retrained; calculate a second metric using the first and second depth estimation values, wherein a value of the second metric indicates whether there are scale errors in the community model that require the community model to be retrained; and share model weights generated by the training with: a central server for updating the global model when the value of the first metric indicates there are structural errors, and other client devices in the community when a value of the second metric indicates there are scale errors.

Those skilled in the art will appreciate that while the foregoing has described what is considered to be the best mode and where appropriate other modes of performing embodiments of this disclosure, embodiments of this disclosure should not be limited to the specific configurations and methods disclosed in this description of the preferred embodiment. Those skilled in the art will recognize that embodiments of this disclosure have a broad range of applications, and that the embodiments may take a wide range of modifications without departing from any inventive concept as defined in the appended claims.

The invention claimed is:

1. A method for training a machine learning, ML, model using federated learning to perform depth estimation, the method comprising:

obtaining and storing a community ML model for training by a community of client devices, wherein the community ML model is a scaled version of a global ML model, the scaling being performed based on computation properties of the client devices;

training the community ML model based on a training database on a client device, the training database comprising suitable images captured by an image capture device of the client device;

obtaining for at least one object in an image from the training database:

a first depth value obtained by a sensor, and a second depth value calculated by the community ML model during the training;

calculating at least one structural metric using the first and second depth values, wherein each structural metric is calculated using a different formula for detecting structural errors in the community ML model, the structural errors requiring the global ML model to be retrained;

calculating at least one scale metric using the first and second depth values, wherein each scale metric is calculated using a different formula for detecting scale errors in the community ML model, the scale errors requiring the community ML model to be retrained;

identifying an error type of the community ML model, a first error type indicating that there are both the structural errors and the scale errors in the community ML model, a second error type indicating that there are only the structural errors in the community ML model, and a third error type indicating that there are only the scale errors in the community ML model; and in a case of the first error type and the second error type, sharing model weights generated by the training with a central server for updating the global ML model, and in a case of the third error type, sharing model weights generated by the training only with other client devices in the community without transmitting the model weights to the central server.

2. The method as claimed in claim 1, wherein sharing model weights generated by the training with other client devices in the community comprises:

transmitting model weights to at least one other client device using a peer-to-peer distribution mechanism, thereby enabling each client device to update their stored community ML model.

3. The method as claimed in claim 1, wherein sharing model weights generated by the training with other client devices in the community comprises:

transmitting model weights to a community central server for aggregation, thereby enabling the community central server to update the community ML model and distribute an updated community central server to the client devices in the community.

4. The method as claimed in claim 1, wherein sharing model weights generated by the training with a central server comprises:

transmitting model weights to a central server for aggregation, thereby enabling the central server to update the global ML model upon which the community ML model is based.

5. The method as claimed in claim 1, wherein calculating the structural metric comprises calculating a scale-invariant root mean square error using the first and second depth values, and wherein calculating the scale metric comprises calculating a root mean square error using the first and second depth values.

6. The method as claimed in claim 5, wherein when the scale-invariant root mean square error is lower than a first predefined value and the root mean square error is higher than a second predefined value, the community ML model has a scale error.

7. The method as claimed in claim 5, wherein when the scale-invariant root mean square error is higher than a first predefined value and the root mean square error is lower than a second predefined value, the community ML model has a structural error.

8. The method as claimed in claim 5, wherein, when the scale-invariant root mean square error is higher than a first predefined value and the root mean square error is higher than a second predefined value, the community ML model has a scale error and a structural error.

9. The method as claimed in claim 1, further comprising:

checking, prior to training the community ML model, whether a client device is able to train the community ML model.

10. The method as claimed in claim 9, wherein the checking comprises checking at least that there are images in the training database to be used for training, and that an operational state of the client device is suitable for training.

11. The method of claim 1, wherein the structural errors relate to the global ML model and all community ML models, and the scale errors relate in particular to the community ML model used on a client device.

12. The method of claim 1, wherein the structural errors comprise errors related to relative depths between the objects or failures to detect the object, and the scale errors comprise errors related to absolute depth of the object.

* * * * *